(12) United States Patent
Sergesketter et al.

(10) Patent No.: US 11,657,493 B2
(45) Date of Patent: *May 23, 2023

(54) THREE-DIMENSIONAL INSPECTION OF A WORKPIECE FOR CONFORMANCE TO A SPECIFICATION

(71) Applicant: The Boeing Company, Chicago, IL (US)

(72) Inventors: Theodore J. Sergesketter, West Lafayette, IN (US); Nathan Alphonse Secinaro, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/481,695

(22) Filed: Sep. 22, 2021

(65) Prior Publication Data

US 2022/0005184 A1   Jan. 6, 2022

Related U.S. Application Data

(63) Continuation-in-part of application No. 16/720,297, filed on Dec. 19, 2019, now Pat. No. 11,138,719.

(51) Int. Cl.
*G06T 7/00* (2017.01)
*G06T 19/20* (2011.01)
(Continued)

(52) U.S. Cl.
CPC .............. *G06T 7/0004* (2013.01); *G06T 7/62* (2017.01); *G06T 11/206* (2013.01); *G06T 15/00* (2013.01);
(Continued)

(58) Field of Classification Search
CPC ....... G06T 7/0004; G06T 19/20; G06T 15/00; G06T 2207/30136; G06T 2219/008;
(Continued)

(56) References Cited

U.S. PATENT DOCUMENTS 7,665,221 B2   2/2010   Bennison et al.
9,715,761 B2   7/2017   Lee et al.
(Continued)

OTHER PUBLICATIONS

Obrist et al. ("Point cloud reconstruction with sub-pixel accuracy by slice-adaptive thresholding of X-ray computed tomography images") NDT&E International 37 (2004) 373-380 (Year: 2004) (Year: 2004).*

(Continued)

*Primary Examiner* — Sing-Wai Wu
*Assistant Examiner* — Khoa Vu
(74) *Attorney, Agent, or Firm* — Sage Patent Group

(57) ABSTRACT

A method for three-dimensional (3D) inspection of a workpiece for conformance to a specification includes scanning, by a 3D optical scanning device, a hole formed in a workpiece to generate a 3D point cloud of the hole defined in a 3-axis coordinate system of the 3D optical scanning device. The 3D point cloud includes 3D point cloud data that provides a profile of the hole. The method also includes translating the 3D point cloud data to generate translated 3D point cloud data that facilitates analysis of the 3D point cloud. The method further includes performing analysis of the hole using the translated 3D point cloud data to determine conformance of the hole with a specification and to detect anomalies associated with the hole.

20 Claims, 21 Drawing Sheets

(51) Int. Cl.
  *G06T 15/00* (2011.01)
  *G06T 7/62* (2017.01)
  *G06T 11/20* (2006.01)
(52) U.S. Cl.
  CPC .... *G06T 19/20* (2013.01); *G06T 2207/10028* (2013.01); *G06T 2207/20072* (2013.01); *G06T 2207/30136* (2013.01); *G06T 2219/008* (2013.01)
(58) Field of Classification Search
  CPC . G06T 2207/20072; G06T 2207/10028; G06T 11/206; G06T 7/62
  See application file for complete search history.

(56) References Cited

U.S. PATENT DOCUMENTS

| | | | | |
|---|---|---|---|---|
| 2010/0164951 | A1* | 7/2010 | Stewart | G01B 11/105 345/419 |
| 2013/0083967 | A1* | 4/2013 | Vorobiov | G06V 10/421 382/103 |
| 2013/0170713 | A1* | 7/2013 | Kumar | G06V 20/00 382/109 |
| 2014/0157610 | A1* | 6/2014 | Garvey | G01B 21/04 33/503 |
| 2014/0253913 | A1* | 9/2014 | Bergman | G01N 21/954 356/241.1 |
| 2015/0134303 | A1* | 5/2015 | Chang | G01B 11/24 703/1 |
| 2016/0370480 | A1 | 12/2016 | Shetty et al. | |
| 2017/0132775 | A1* | 5/2017 | Ramamurthy | G06T 7/0006 |
| 2017/0140539 | A1* | 5/2017 | Wang | B25J 9/1697 |
| 2018/0101160 | A1* | 4/2018 | Desjardien | G06T 7/0004 |

OTHER PUBLICATIONS

Obrist et al., "Point cloud reconstruction with sub-pixel accuracy by slice-adaptive thresholding of X-ray computed tomography images," NDT&E International 37 (2004), pp. 373-380.

* cited by examiner

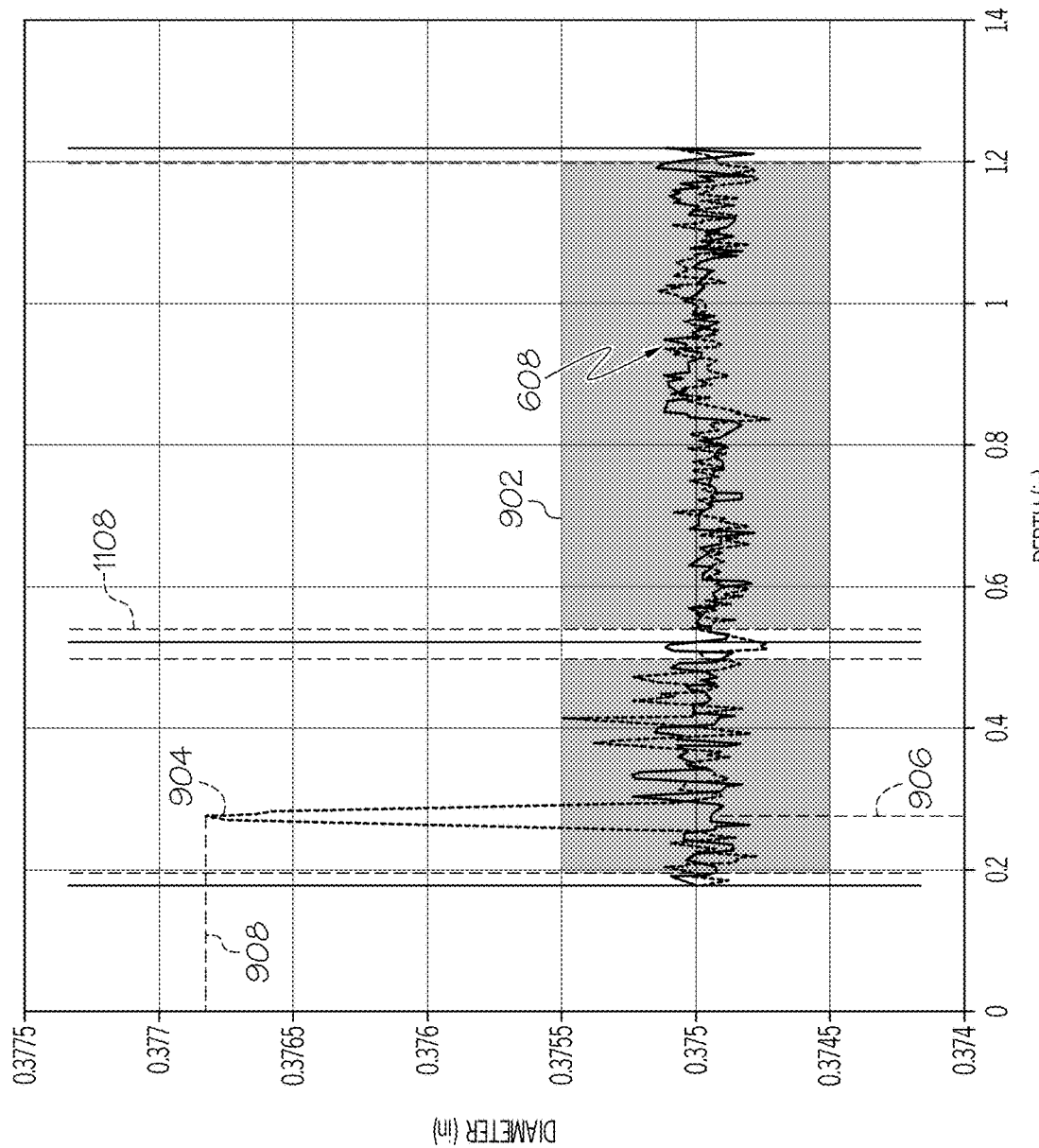

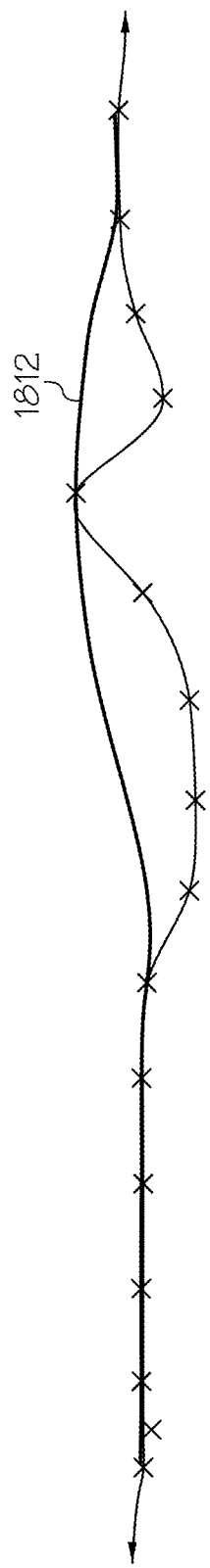

THREE-DIMENSIONAL INSPECTION OF A WORKPIECE FOR CONFORMANCE TO A SPECIFICATION

CROSS-REFERENCE TO RELATED APPLICATIONS

This application is a continuation-in-part of U.S. application Ser. No. 16/720,297, entitled "Three-Dimensional Inspection of a Workpiece for Conformance to a Specification," filed Dec. 19, 2019, now U.S. Pat. No. 11,138,719, issued Oct. 5, 2021, and is assigned to the same assignee as the present application.

FIELD

The present disclosure relates to inspection of a workpiece and more particularly to three-dimensional (3D) inspection of a workpiece for conformance to a specification.

BACKGROUND

In the production of components, such as components for an aircraft or other article of manufacture, verifying conformance of a processed component to a specification and that the manufacturing process is stable over repetitive operations is an important factor. This is particularly important in drilling holes in a workpiece, such as a composite material panel, that includes multiple layers of different types of materials. For example, a composite material panel may include a layer of carbon fiber material disposed over a layer of aluminum, an alloy, or some other metallic material. As a hole is drilled through the different layers of materials, anomalies can result that may result in the hole not conforming to a specification. Additionally, current hole inspection technologies may not be effective in verifying conformances to within a few thousandths of an inch.

SUMMARY

In accordance with an embodiment, a method includes scanning, by a three-dimensional (3D) optical scanning device, a hole formed in a workpiece to generate a 3D point cloud of the hole defined in a 3-axis coordinate system of the 3D optical scanning device. The 3D point cloud includes 3D point cloud data that provides a profile of the hole. The method also includes translating the 3D point cloud data to generate translated 3D point cloud data that facilitates analysis of the 3D point cloud. The method additionally includes performing analysis of the hole using the translated 3D point cloud data to determine conformance of the hole with a specification and to detect anomalies associated with the hole.

In accordance with an embodiment, a method includes scanning, by a three-dimensional (3D) optical scanning device, a hole formed in a workpiece to generate a 3D point cloud of the hole defined in a 3-axis coordinate system of the 3D optical scanning device. The 3D point cloud includes a multiplicity of data points, and each data point comprises 3D point cloud data that provides a profile of the hole. The method also includes translating the 3D point cloud data to generate translated 3D point cloud data that facilitates analysis of the 3D point cloud and performing analysis of the hole using the translated 3D point cloud data to determine conformance of the hole with a specification and to detect anomalies associated with the hole. Performing analysis of the hole includes determining conformance of a diameter of the hole to a specification. Determining conformance of the diameter of the hole to the specification includes converting the translated 3D point cloud data to 2D data; choosing a first cutting plane parallel to an axis of the hole; choosing a second cutting plane rotated a predetermined number of degrees about the axis of the hole relative to the first cutting plane; determining the diameter of the hole along each cutting plane to provide hole diameter data; filtering or smoothing the hole diameter data to provide filtered or smoothed hole diameter data; generating a graph of the diameter of the hole along an extent of the hole for each cutting plane using the filtered or smoothed hole diameter data; and comparing the graphs of the diameter of the hole to the specification to determine conformance of the hole diameter to the specification.

In accordance with an embodiment, a system includes a processor and a memory associated with the processor. The memory includes computer-readable program instructions that, when executed by the processor causes the processor to perform a set of functions including scanning a hole formed in a workpiece to generate a 3D point cloud of the hole defined in a 3-axis coordinate system of a 3D optical scanning device. The 3D point cloud includes 3D point cloud data that provides a profile of the hole. The set of functions also include translating the 3D point cloud data to generate translated 3D point cloud data that facilitates analysis of the 3D point cloud. The set of functions additionally include performing analysis of the hole using the translated 3D point cloud data to determine conformance of the hole with a specification and to detect anomalies associated with the hole.

In accordance with an embodiment, a system includes a processor and a memory associated with the processor. The memory includes computer-readable program instructions that, when executed by the processor causes the processor to perform a set of functions includes scanning, by a three-dimensional (3D) optical scanning device, a hole formed in a workpiece to generate a 3D point cloud of the hole defined in a 3-axis coordinate system of the 3D optical scanning device. The 3D point cloud includes a multiplicity of data points, and each data point includes 3D point cloud data that provides a profile of the hole. The set of functions also include translating the 3D point cloud data to generate translated 3D point cloud data that facilitates analysis of the 3D point cloud. The set of functions also include performing analysis of the hole using the translated 3D point cloud data to determine conformance of the hole with a specification and to detect anomalies associated with the hole. Performing analysis of the hole includes determining conformance of a diameter of the hole to a specification. Determining conformance of the diameter of the hole to the specification includes converting the translated 3D point cloud data to 2D data; choosing a first cutting plane parallel to an axis of the hole; choosing a second cutting plane rotated a predetermined number of degrees about the axis of the hole relative to the first cutting plane; determining the diameter of the hole along each cutting plane to provide hole diameter data; filtering or smoothing the hole diameter data to provide filtered or smoothed hole diameter data; generating a graph of the diameter of the hole along an extent of the hole for each cutting plane using the filtered or smoothed hole diameter data; and comparing the graphs of the diameter of the hole to the specification to determine conformance of the hole diameter to the specification.

In accordance with an embodiment and any of the preceding embodiments, wherein filtering or smoothing the hole diameter data includes using a simulated ball probe.

In accordance with an embodiment and any of the preceding embodiments, wherein filtering or smoothing the hole diameter data includes formulating an equation to simulate a ball probe including a predetermined diameter. The equation defines points on a perimeter of a circle corresponding to a perimeter of the simulated ball probe.

In accordance with an embodiment and any of the preceding embodiments, wherein filtering or smoothing the hole diameter data includes a process. The process includes: selecting a data point or a next selected data point for at least some data points of the multiplicity of data points of the hole diameter data of the hole; modifying the equation to be tangent to the selected data point, wherein the equation defines a perimeter of a first circle corresponding to the simulated ball probe through the selected data point; identifying other data points within the perimeter of the first circle; determining a farthest data point of the other data points that is a farthest distance from the perimeter of the first circle, wherein the farthest data point corresponds to the simulated ball probe at a highest position; determining an equation for a perimeter of a second circle corresponding to the simulated ball probe tangent to the farthest data point, wherein a difference between the perimeters of the first circle and the second circle defines an offset; and translating coordinates of the selected data point or the next selected data point by an amount of the offset.

In accordance with an embodiment and any of the preceding embodiments, further including selecting the next data point and repeating the process for each data point of the at least some data points, wherein the translated coordinates for the at least some data points correspond to the filtered or smoothed hole diameter data.

In accordance with an embodiment and any of the preceding embodiments, the method and system also include separating the 3D point cloud data into individual 2D layers; fitting a circle to each layer of 3D point cloud data; and fitting a linear line to an origin of each circle. The linear line defines a center or axis of the hole. Translating the 3D point cloud data includes realigning the center or axis of the hole to correspond to a Z-axis of a three-dimensional coordinate system. Realigning the center of the hole includes translating an X, Y coordinates of the 3D point cloud data in each 2D layer so that the center of the hole corresponds to the Z-axis.

In accordance with an embodiment and any of the preceding embodiments, wherein performing analysis of the hole using the translated 3D point cloud data includes determining conformance of a diameter of the hole to a specification.

In accordance with an embodiment and any of the preceding embodiments, wherein determining the conformance of the diameter of the hole to the specification includes generating a plurality of graphs of a diameter of the hole along an extent of the hole. Each graph corresponds to a different location about a circumference of the hole.

In accordance with an embodiment and any of the preceding embodiments, the method and system further include comparing the graphs of the diameter of the hole along an extent of the hole to the specification by superimposing a range of tolerance of the diameter of the hole on the graphs to determine conformance of the diameter of the hole to the specification. The method and system also include presenting a notification in response to the diameter of the hole being in conformance with the specification. The method and system further include presenting an alert in response to the diameter of the hole not being in conformance with the specification.

In accordance with an embodiment and any of the preceding embodiments, the method and system further include converting the translated 3D point cloud data to 2D data in response to the specification including 2D hole diameter data.

In accordance with an embodiment and any of the preceding embodiments, the method and system further include choosing a first cutting plane parallel to an axis of the hole; and choosing a second cutting plane rotated a predetermined number of degrees about the axis of the hole relative to the first cutting plane.

In accordance with an embodiment and any of the preceding embodiments, the method and system further include determining a diameter of the hole along each cutting plane; generating a graph of the diameter of the hole along an extent of the hole for each cutting plane; comparing the graphs of the diameter of the hole to the specification to determine conformance of the hole diameter to the specification; presenting a notification in response to the diameter of the hole being in conformance with the specification; and presenting an alert in response to the diameter of the hole not being in conformance with the specification.

In accordance with an embodiment and any of the preceding embodiments, wherein performing analysis of the hole using the translated 3D point cloud data includes calculating erosion of the hole caused during drilling the hole.

In accordance with an embodiment and any of the preceding embodiments, wherein calculating erosion of the hole includes generating a plurality of graphs of a diameter of the hole along an extent of the hole, each graph corresponding to a different location about a circumference of the hole; superimposing a range of tolerance of a diameter of the hole on the graphs; identifying one or more spikes in the graphs above the range of tolerance of the diameter of the hole; determining a width of each spike of the one or more spikes; summing the width of the one or more spikes to calculate the erosion of the hole; and presenting erosion data to an operator.

In accordance with an embodiment and any of the preceding embodiments, wherein determining a width of each spike includes calculating a slope of each spike; interpolating a position on each spike relative to a maximum diameter tolerance of the diameter of the hole; and determining a distance between two points on the spike where the spike corresponds to the maximum diameter tolerance of the diameter of the hole.

In accordance with an embodiment and any of the preceding embodiments, wherein performing analysis of the hole includes locating one or more areas associated with the hole that contain an anomaly.

In accordance with an embodiment and any of the preceding embodiments, wherein the anomaly includes at least one of a gap, foreign object debris, a fiber breakout, and a delamination.

In accordance with an embodiment and any of the preceding embodiments, wherein the hole is drilled in a panel comprising a plurality of layers.

In accordance with an embodiment and any of the preceding embodiments, wherein the plurality of layers comprise a non-metallic layer and a metallic layer.

In accordance with an embodiment and any of the preceding embodiments, wherein the hole is non-cylindrical.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 9 is an example of a plurality of graphs of the hole diameter along each cutting plane in accordance with an embodiment of the present disclosure.

FIGS. 18A-18E illustrate the exemplary method for filtering or smoothing 3D point cloud data in FIG. 17.

DETAILED DESCRIPTION

Figure 1:
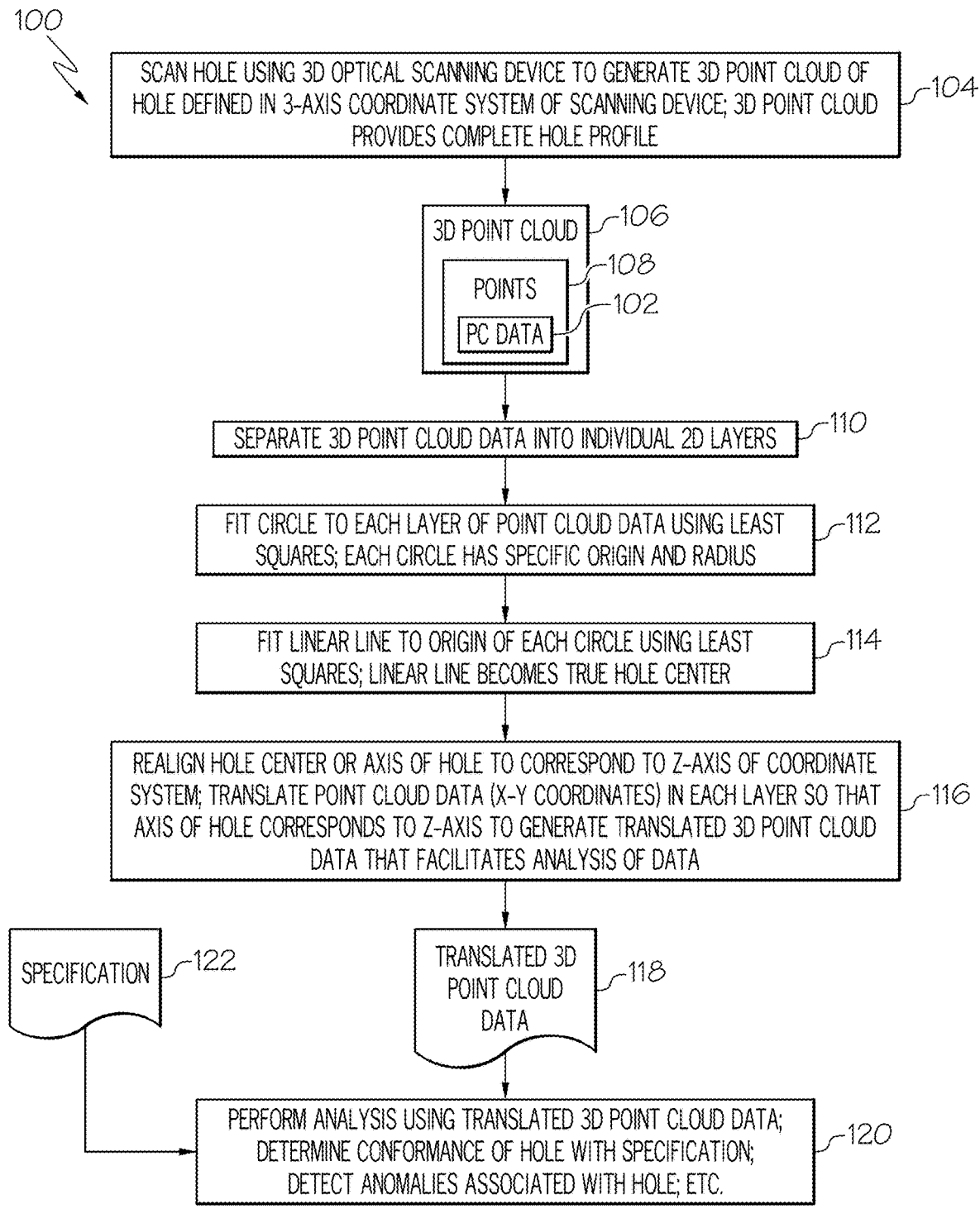
FIG. 1 is a flow chart of an example of a method for generating 3D point cloud data for inspection of a hole in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 2:
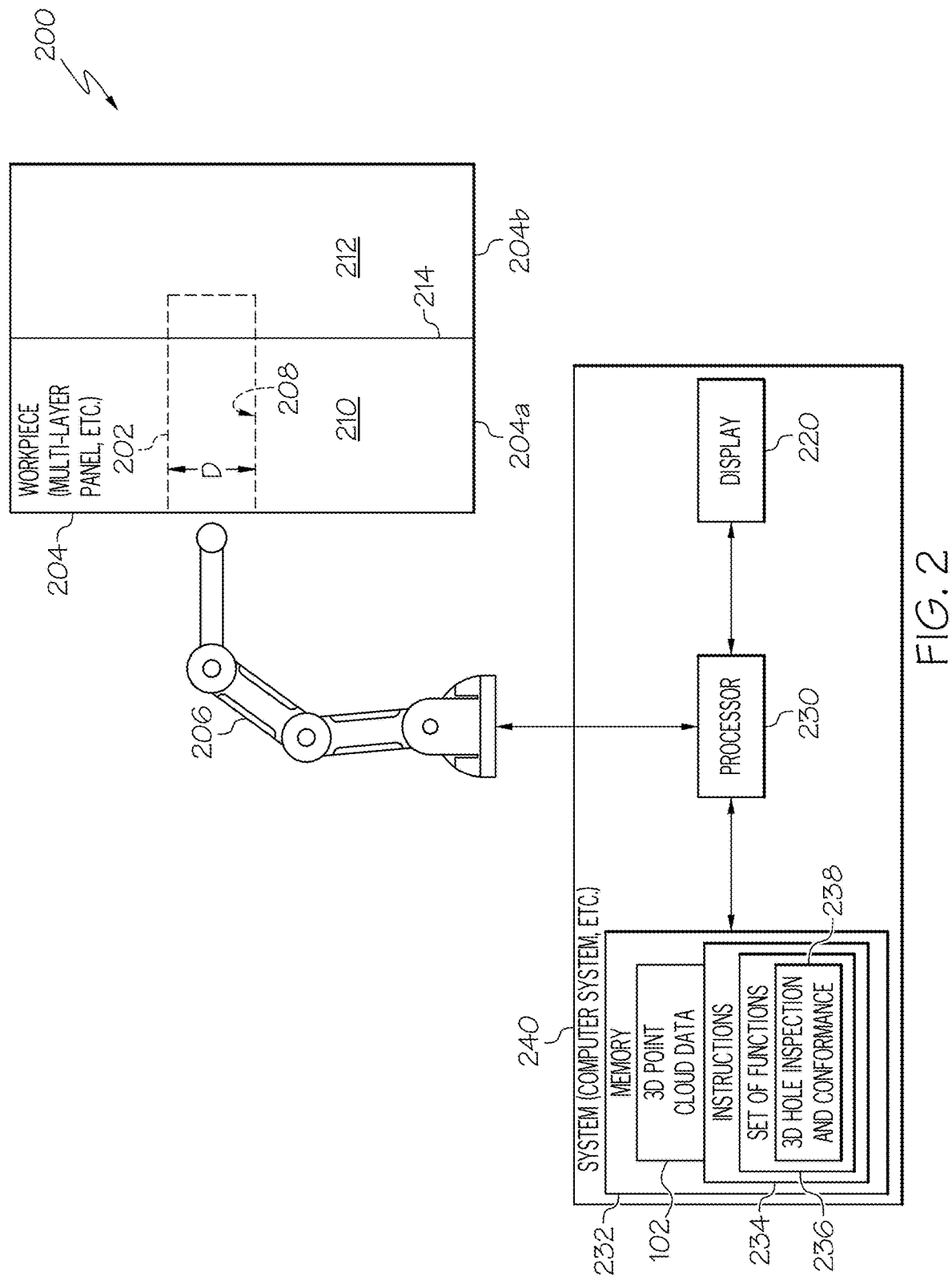
FIG. 2 is a block schematic diagram of an example of a system for generating a 3D point cloud data for inspection of a hole in accordance with an embodiment of the present disclosure.
Figure 3A:
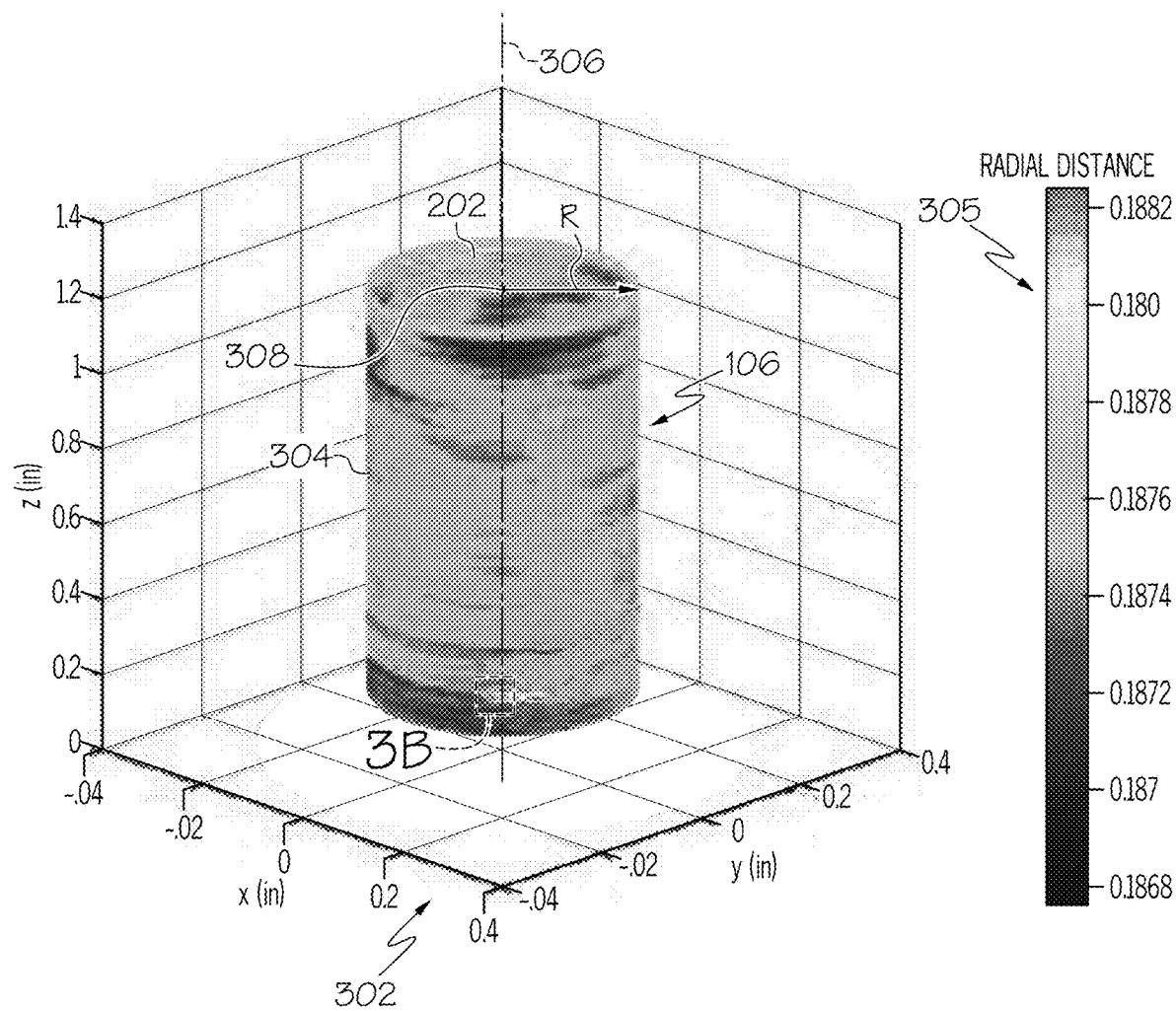
FIGS. 3A and 3B are an illustration of an example of separating 3D point cloud data into individual two-dimensional (2D) layers in accordance with an embodiment of the present disclosure.

FIG. 1 is a flow chart of an example of a method 100 for generating 3D point cloud data for inspection of a hole in accordance with an embodiment of the present disclosure. Referring also to FIG. 2, FIG. 2 is a block schematic diagram of an example of a system 200 for generating a 3D point cloud data 102 (FIG. 1) for inspection of a hole 202 in accordance with an embodiment of the present disclosure. In accordance with an example, the method 100 is embodied in and performed by the system 200 of FIG. 2. In block 104 of FIG. 1, a hole 202 (FIG. 2) formed in a workpiece 204 is scanned by a three-dimensional (3D) optical scanning device 206 to generate a 3D point cloud 106 of the hole 202. The 3D point cloud 106 is defined in a 3-axis coordinate system 302 (FIG. 3A) of the 3D optical scanning device 206. The 3D point cloud 106 includes 3D point cloud data 102 that provides a profile 304 (FIG. 3A) of the hole 202. The 3D point cloud 106 includes a multiplicity of points 108. Each point 108 includes 3D point cloud data 102 that defines a 3D coordinate location 208 on an interior surface of the hole 202 based on the 3D coordinate system 302 of the 3D optical scanning device 206. Collectively, the 3D point cloud data 102 of the multiplicity of points 108 provide the profile 304 of the hole 202. The 3D point cloud data 102 in the profile 304 of the hole 202 are represented by different colors 305 based on a radius (R) or radial distance of the hole 202 at a 3D coordinate location 208 of a particular point 108 of the 3D point cloud 106 measured from an axis 306 or center axis of the hole 202. The axis 306 through the hole 202 defines the center 308 of the hole 202. In the example in FIG. 3A, the axis 306 of the hole 202 corresponds to an origin (X=0, Y=0) of the 3D coordinate system 302 of the 3D optical scanning device 206. While the exemplary hole 202 in FIG. 3A is illustrated as being substantially cylindrically shaped, the methods and systems described herein are configurable to inspect a workpiece for conformance of holes that are non-cylindrically shaped, such as holes with an elliptical cross-sectional shape or another geometric shape other than round or circular.

Figure 3B:
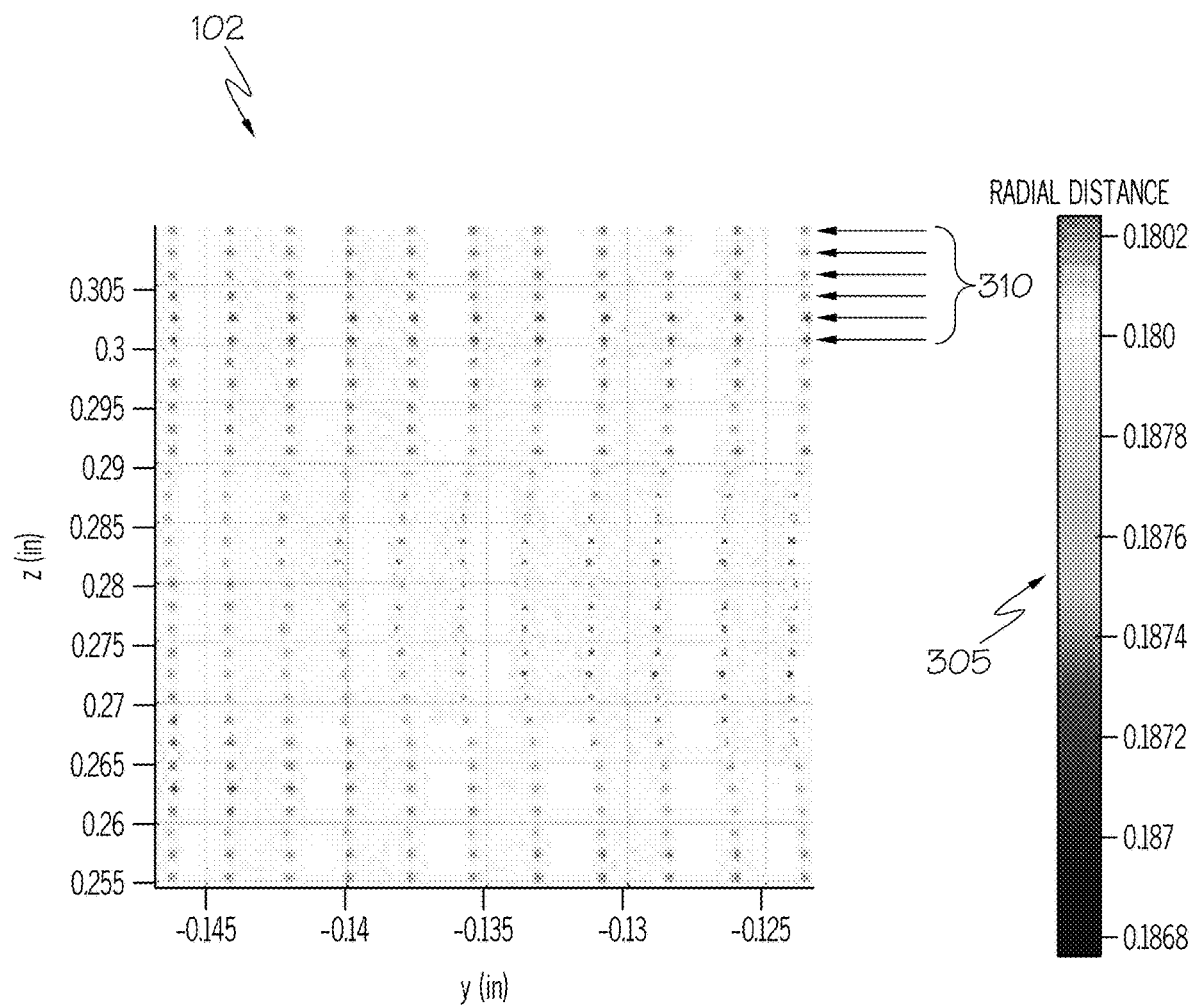

In block 110 of FIG. 1, the 3D point cloud data 102 is separated into individual two-dimensional (2D) layers. Referring to FIG. 3B, FIG. 3B is an illustration of an example of separating 3D point cloud data 102 into individual 2D layers 310 in accordance with an embodiment of the present disclosure. In accordance with an example, each 2D layer is about 0.002 inches apart along the axis 306 of the hole 202 or along a Z-axis of the 3D coordinate system 302 of the 3D optical scanning device 206.

Figure 4:
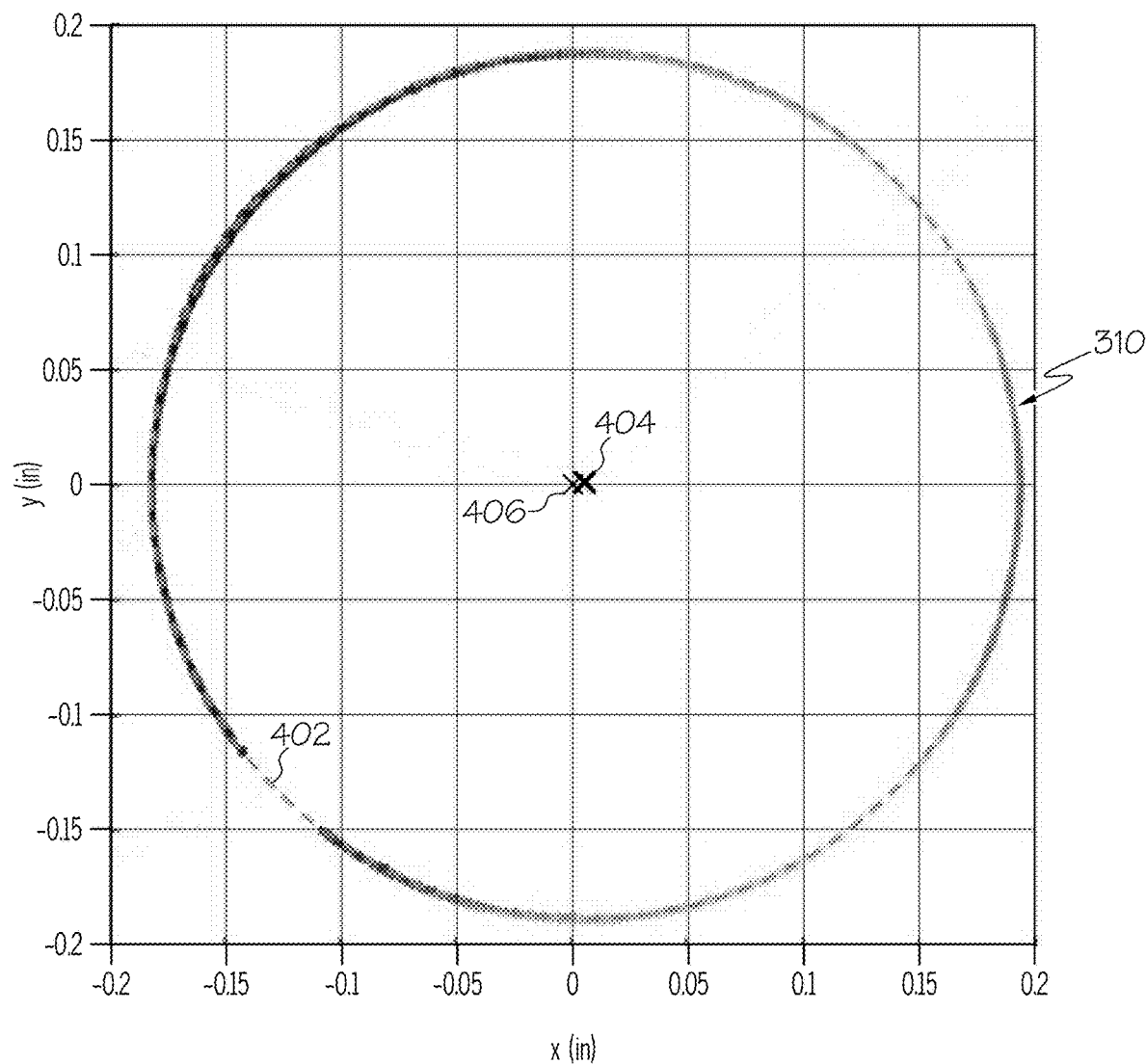
FIG. 4 is an illustration of an example of fitting a circle to each 2D layer of point cloud data in accordance with an embodiment of the present disclosure.

In block 112 of FIG. 1, a circle 402 (FIG. 4) is fit to each 2D layer 310 of 3D point cloud data 102. Referring also to FIG. 4, FIG. 4 is an illustration of an example of fitting a circle 402 to each 2D layer 310 of point cloud data 102 in accordance with an embodiment of the present disclosure. In accordance with the example in FIG. 4, a circle 402 is fit to each 2D layer 310 of point cloud data 102 using the least squares method. As illustrated in FIG. 4, an origin 404 of the best fit circle 402 does not necessarily coincide with the origin 406 of the 3D optical scanning device 206. Additionally, the origin 404 of the best fit circle 402 of each of the 2D layers 310 also do not necessarily coincide. Accordingly, the origin 404 of the best fit circle 402 of any particular 2D layer 310 cannot be assumed as a new origin for the 3D point cloud data 102 of the hole 202 because some anomalies or defects in the hole 202 may be reduced or not visible at all during the inspection process.

Figure 5:
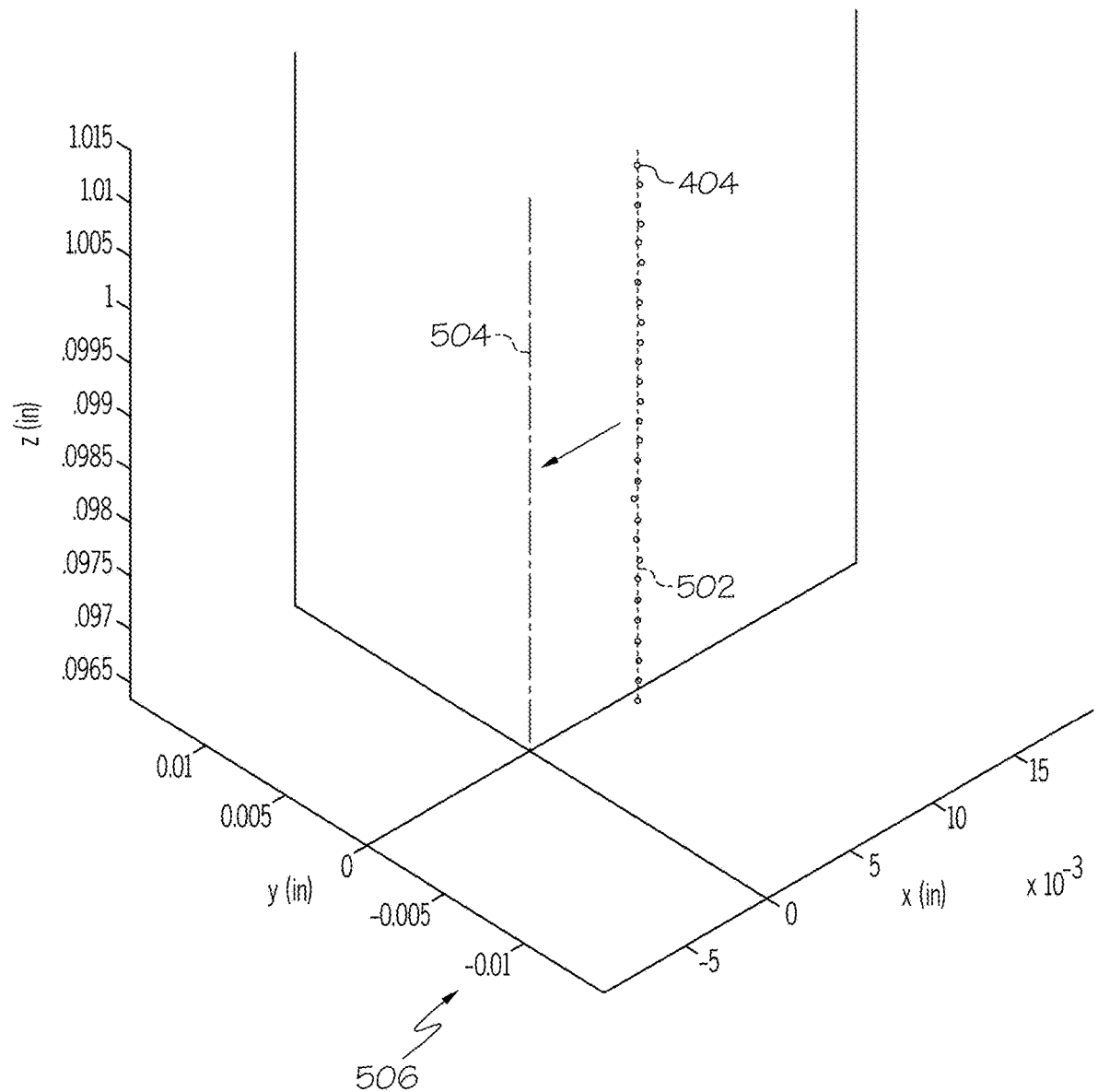
FIG. 5 is an illustration of an example of fitting a linear line to an origin of each circle and realigning a center of the hole to correspond to a Z-axis of a 3D coordinate system in accordance with an embodiment of the present disclosure.

In block 114 of FIG. 1, a linear line 502 (FIG. 5) is fit to through the origin 404 of all the best fit circles 402. In accordance with an example, the linear line 502 is fit through the origin 404 of all the best fit circles using the least squares method. The linear line 502 becomes the true center 308 of the hole 202. The linear line 502 defines a new axis 306 of the hole 202. Referring also to FIG. 5, FIG. 5 is an illustration of an example of fitting a linear line 502 to the origins 404 of all the best fit circles 402 and realigning an axis 306 of the hole 202 to correspond to a Z-axis 504 of a 3D coordinate system 506 in accordance with an embodiment of the present disclosure.

In block 116 of FIG. 1, the 3D point cloud data 102 is translated to generate translated 3D point cloud data 118 that facilitates analysis of the 3D point cloud 106 and the 3D point cloud data 102. Translating the 3D point cloud data 102 includes realigning the axis 306 or center 308 of the hole 202 to correspond to a Z-axis 504 of a 3D coordinate system 506 that facilitates analysis of the 3D point cloud data 102. Realigning the center 308 or axis 306 of the hole 202 includes translating the X, Y coordinates of the 3D point cloud data 102 in each 2D layer 310 so that the axis 306 or center 308 of the hole 202 corresponds to the Z-axis 504 of the 3D coordinate system 506.

In block 120 of FIG. 1, analysis of the hole 202 is performed using the translated 3D point cloud data 118 to determine conformance of the hole 202 with a specification 122 for the workpiece 204 and to detect anomalies or defects associated with the hole 202.

Figure 6:
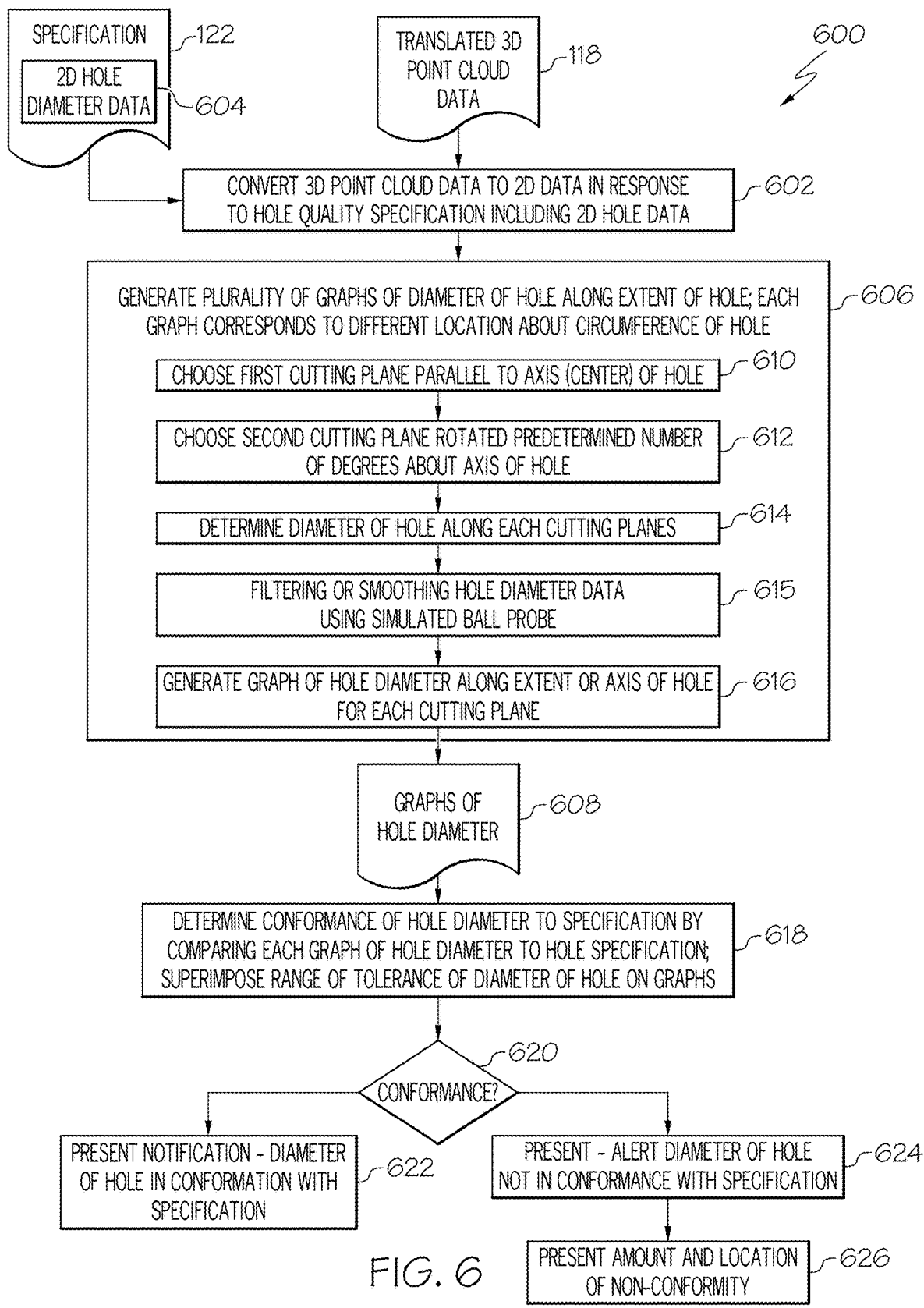
FIG. 6 is a flow chart of an example of a method for determining conformance of a hole diameter to a specification in accordance with an embodiment of the present disclosure.

In accordance with an example, performing analysis of the hole 202 using the translated 3D point cloud data 118 in block 120 includes determining conformance of a diameter of the hole 202 to a specification 122. FIG. 6 is a flow chart of an example of a method 600 for determining conformance of a diameter "D" (FIG. 2) of a hole 202 to a specification 122 in accordance with an embodiment of the present disclosure.

In block 602, the translated 3D point cloud data 118 is converted to 2D point cloud data in response to the specification 122 including 2D hole diameter data 604. This step is not necessary if the specification 122 includes 3D hole diameter data.

In block 606, determining the conformance of the diameter of the hole 202 to the specification 122 includes generating a plurality of graphs 608 (refer also to FIG. 9) of a diameter of the hole 202 along an extent or axis 306 (FIG. 3A) of the hole 202. Each graph 608 corresponding to the diameter of the hole 202 at a different location about a circumference of the hole 202 and extending linearly along the extent of the hole 202 parallel to the axis 306 of the hole 202.

Figure 7:
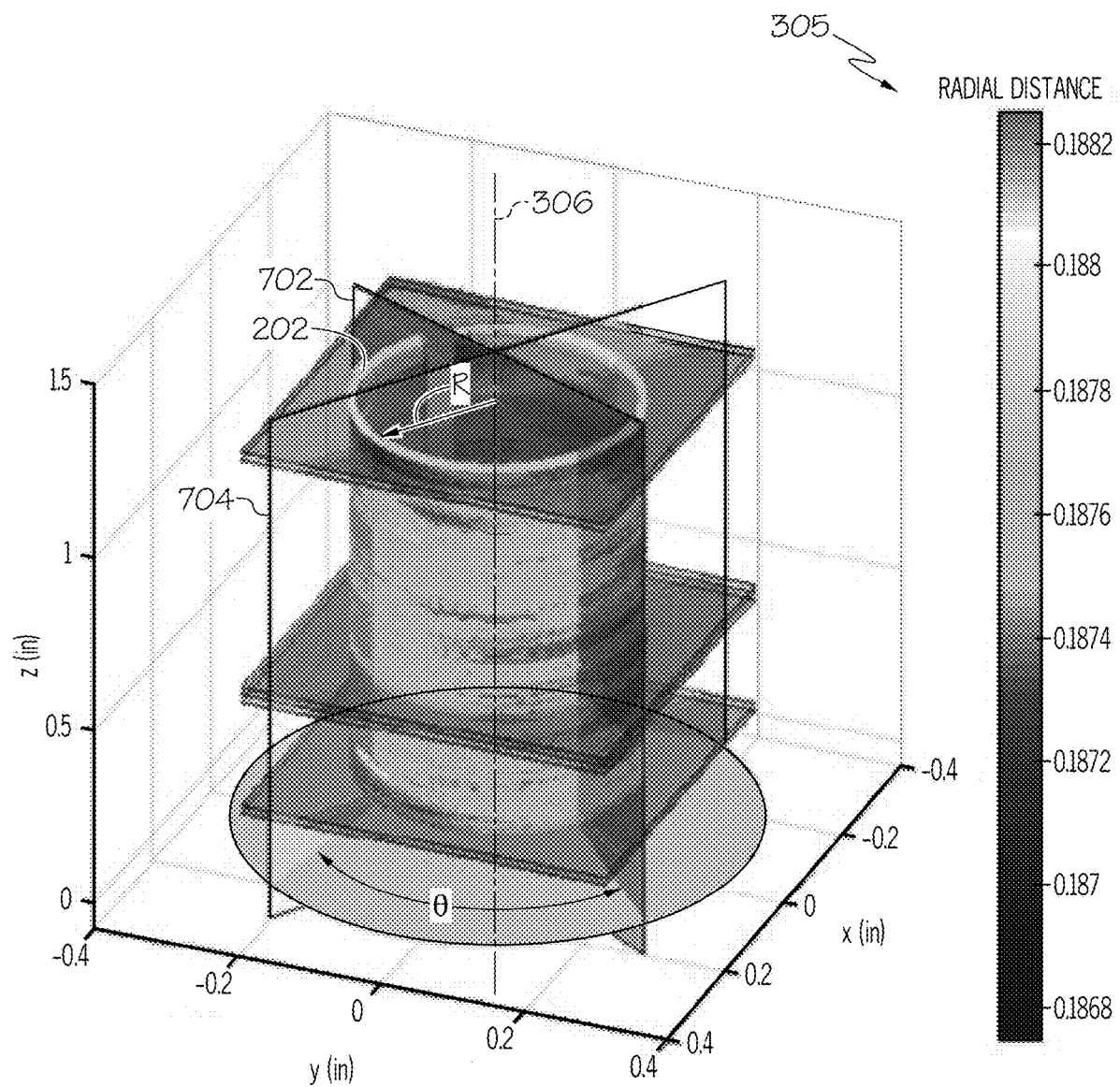
FIG. 7 is an illustration an example of choosing cutting planes parallel to an axis of the hole for generating graphs of a diameter of the hole along an extent of the hole in accordance with an embodiment of the present disclosure.

In accordance with an example, generating the plurality of graphs 608 of a diameter of the hole 202 in block 606 includes blocks 610-616 in FIG. 6. In block 610, a first cutting plane 702 (FIG. 7) parallel to an axis 306 of the hole 202 is chosen. In block 612, a second cutting plane 704 rotated a predetermined number of degrees theta (e) about the axis 306 of the hole 202 relative to the first cutting plane 702 is chosen. Referring also to FIG. 7, FIG. 7 is an illustration an example of choosing cutting planes 702 and 704 parallel to an axis 306 of the hole 202 for generating the graphs 608 of the diameter of the hole 202 along the extent or axis 306 of the hole 202 in accordance with an embodiment of the present disclosure. In accordance with the example if FIG. 7, the predetermined number of degrees that the second cutting plane 704 is rotated relative to the first cutting plane is 90 degrees.

In block 614, a diameter of the hole 202 or hole wall is determined along each cutting plane 702 and 704. The diameter of the hole 202 determined along each cutting plane 702 and 704 defines hole diameter data of the hole or hole wall. In block 615, the method 600 includes filtering or smoothing the hole diameter data to provided filtered or smoothed hole diameter data. In some examples, filtering or smoothing the hole diameter data includes using a simulated ball probe. An example of a method for filtering or smoothing hole diameter data will be described with reference to FIG. 17 and FIGS. 18A-18E.

In block 616, a graph 608 of the diameter of the hole 202 along an extent of the hole 202 for each cutting plane 702 and 704 is generated using the filtered or smoothed hole diameter data. FIG. 9 is an example of a plurality of graphs 608 of the hole 202 diameter along each cutting plane 702 and 704 in accordance with an embodiment of the present disclosure.

Figure 8B:
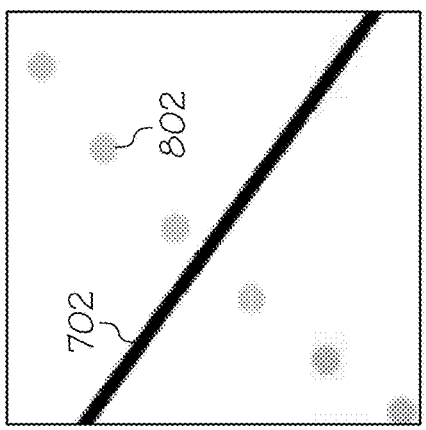
FIGS. 8A-8C are an illustration of an example of determining a diameter of the hole along the cutting planes in accordance with an embodiment of the present disclosure.
Figure 8C:
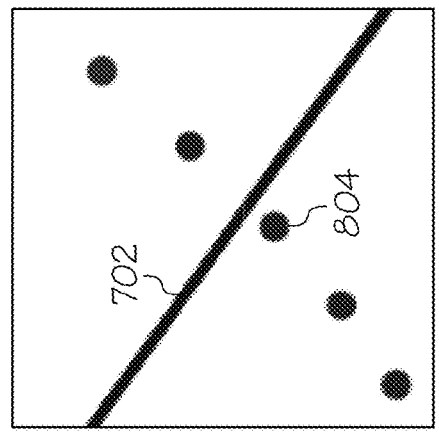
Figure 8A:
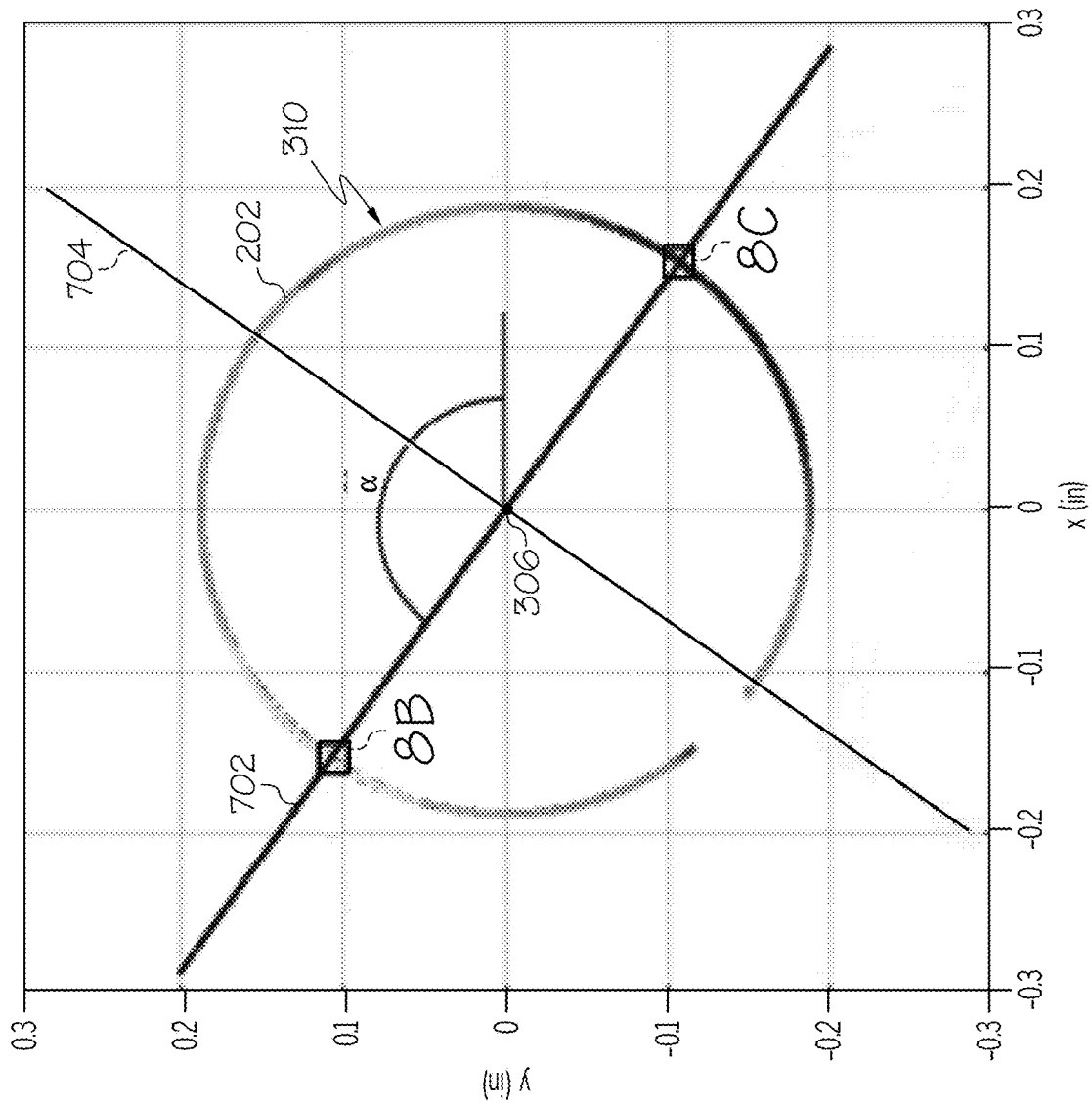

Referring also to FIGS. 8A-8C, FIGS. 8A-8C are an illustration of an example of determining a diameter of the hole 202 along the cutting planes 702 and 704 in accordance with an embodiment of the present disclosure. For each 2D layer 310 of point cloud data 102, the angle between the Y-axis and each 2D data point 802 is calculated. In addition, the angles between the Y-axis and each cutting plane 702 and 704 is known. The data points 802 and 804 closest to the first cutting plane 702 above and below the Y-axis are chosen and the distance between the two data points 802 and 804 is calculated. This distance is the diameter of the hole 202 for that 2D layer 310 of 3D point cloud data 102 relative to the chosen cutting plane 702 or 704. This distance is calculated for every 2D layer 310 of 3D point cloud data 102 and for both cutting planes 702 and 704. The diameters are plotted or graphed in 2D where the diameter can be compared to the specification 122 as illustrated in FIG. 9.

In block 618 of FIG. 6, the graphs 608 of the diameter of the hole 202 along an extent of the hole 202 are compared to the specification 122 by superimposing a range of tolerance 902 (FIG. 9) of the diameter of the hole 202 on the graphs 608 to determine conformance of the diameter of the hole 202 to the specification 122. The range of tolerance 902 corresponds to the range of tolerances for the diameter of the hole 202 in the specification 122.

In block 620, a determination is made if the diameter of the hole 202 is in conformance with the specification 122. If the diameter of the hole 202 is in conformance with the specification 122, the method 600 advances to block 622. In block 622, a notification is presented, that the diameter of the hole is in conformance with the specification 122, in response to the diameter of the hole 202 being in conformance with the specification 122.

If the diameter of the hole 202 is not in conformance with the specification in block 620, the method 600 advances to block 624. In block 624, an alert is presented, that the diameter of the hole 202 is not in conformance with the specification, in response to the diameter of the hole not being in conformance with the specification 122. In accordance with an example, in block 626, an amount that the diameter of the hole 202 is out of conformance or tolerance and a location of the non-conforming diameter are presented. In the example illustrated in FIG. 9, one of the graphs 608 of the diameter of the hole 202 shows a diameter 904 that is out of the range of tolerance 902 and is therefore a non-conforming diameter. FIG. 9 shows a depth 906 in the hole 202 where the diameter is out of tolerance 902 and an amount 908 that the diameter of the hole 202 is out of tolerance 902.

Figure 10:
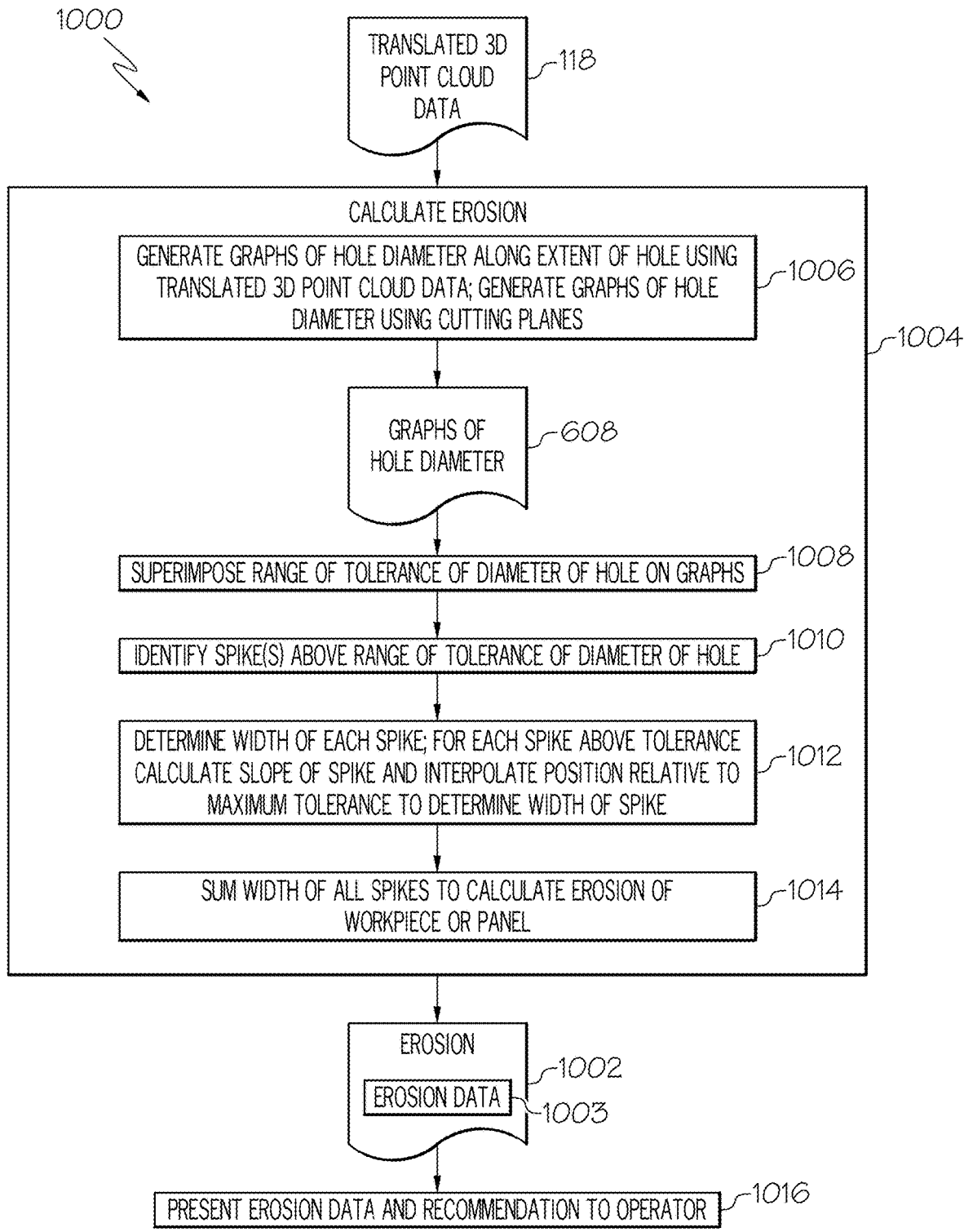
FIG. 10 is a flow chart of an example of a method for calculating erosion of a hole using a plurality of graphs of a diameter of the hole in accordance with an embodiment of the present disclosure.
Figure 11A:
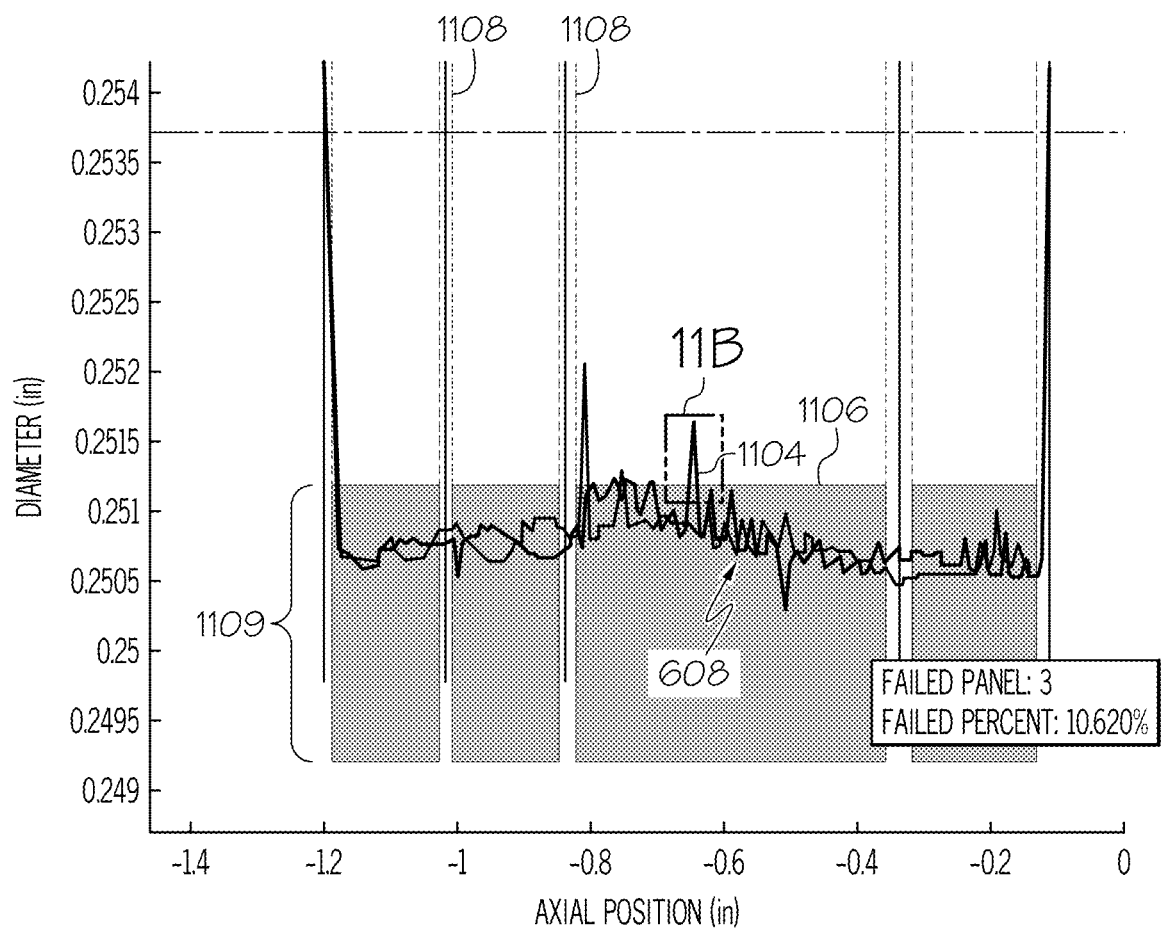
FIGS. 11A-11B are an illustration of an example of calculating the erosion of the hole using the plurality of graphs of the diameter of the hole in accordance with the exemplary method in FIG. 10.
Figure 11B:
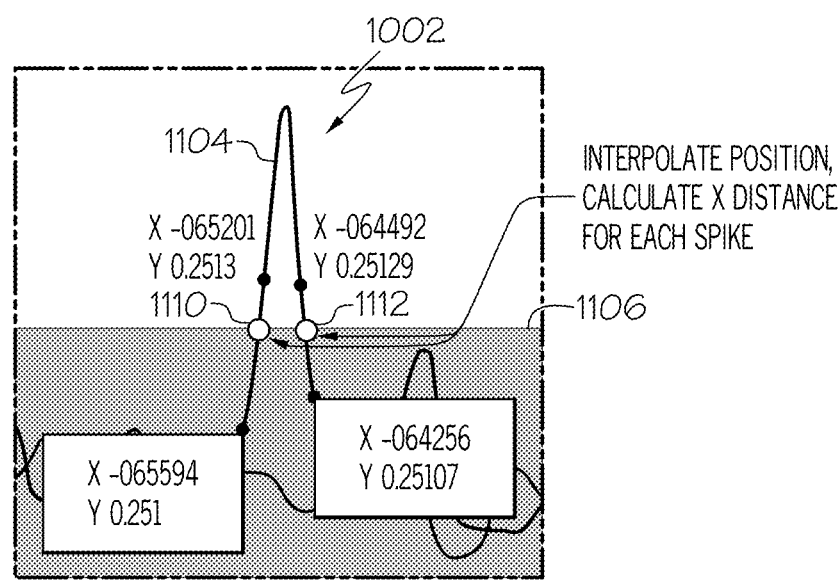

In accordance with an example, performing analysis of the hole 202 includes calculating erosion 1002 (FIG. 10) of the hole 202 caused during drilling the hole 202. The erosion 1002 calculated is defined by erosion data 1003. Erosion 1002 of the hole 202 is calculated using the translated 3D point cloud data 118. FIG. 10 is a flow chart of an example of a method 1000 for calculating erosion 1002 of the hole 202 using the plurality of graphs 608 of the diameter of the hole 202 in accordance with an embodiment of the present disclosure. Referring also to FIGS. 11A-11B, FIGS. 11A-11B are an illustration of an example of calculating the erosion 1002 of the hole 202 using the plurality of graphs 608 of the diameter of the hole 202 in accordance with the exemplary method 1000 in FIG. 10. Erosion 1002 may occur in a workpiece, such as the exemplary workpiece 204 in FIG. 2, that includes layers of different types of materials 210-212. In the example in FIG. 2, the workpiece 204 is a multi-layer panel that includes a first layer 204a that is a non-metallic layer 210, such as a carbon fiber material, and a second layer 204b that is a metallic layer 212, such as aluminum or some other metal or alloy. As a drill bit passes from the non-metallic layer 210 into the metallic layer 212, metal chips are created during the drilling that are pulled back through the flutes of the drill bit and scrape the non-metallic layer 210 within the hole 202. The scrapes cause spikes 1104 (FIGS. 11A-11B) over a maximum diameter tolerance 1106 of the diameter of the hole 202. In accordance with an example, the hole 202 is determined to be non-conforming if more than a predetermined percentage, for example 5%, of the diameter of the hole 202 in the non-metallic layer 210 is eroded. The interface 214 (FIG. 2) between the different types of materials 210-212 are illustrated in FIG. 11A by interfaces 1108.

In block 1004 of FIG. 10, the erosion 1002 is calculated. In accordance with an example, calculating the erosion 1002 includes blocks 1006-1014. In block 1006, a plurality of graphs 608 of a diameter of the hole 202 along an extent of the hole 202 are generated. Each graph 608 corresponds to the diameter of the hole 202 at a different location about a circumference of the hole 202 and extending linearly along the extent of the hole 202 parallel to the axis 306 (FIG. 3A) of the hole 202. In accordance with an example, the graphs 608 of the diameter of the hole 202 are generated the same way as that described with reference to FIG. 6. The same graphs 608 of the diameter of the hole 202 generated in the method 600 of FIG. 6 for determining conformance of the diameter of the hole 202 may be used for calculating the erosion 1002 in method 1000.

In block 1008, a range of tolerance 1109 of a diameter of the hole 202 is superimposed on the graphs 608. In block 1010, one or more spikes 1104 (FIGS. 11A-11B) in the graphs 608 above the range of tolerance 1109 or above the maximum diameter tolerance 1106 of the hole 202 are identified.

In block 1012, a width of each spike 1104 of the one or more spikes 1104 is determined. As illustrated in FIGS. 11A-11B, determining a width of each spike 1104 includes calculating a slope of each spike 1104 and interpolating a position on each spike 1104 relative to the maximum diameter tolerance 1106 of the hole 202. A distance between two points 1110 and 1112 on the spike 1104 where the spike 1104 corresponds to the maximum diameter tolerance 1106 of the hole 202 is determined. The distance between the two points 1110 and 1112 is the width of the spike 1104.

In block 1014, the width of the one or more spikes 1104 are summed to calculate the erosion 1002 of the hole 202.

In block 1016, the erosion 1002 or erosion data 1003 defining the erosion 1002 is presented to an operator. In accordance with the example in FIG. 2, the erosion data 1003 is presented to the operator on a display 220 of the system 200 for inspection of a hole 202 in a workpiece 204.

Figure 12:
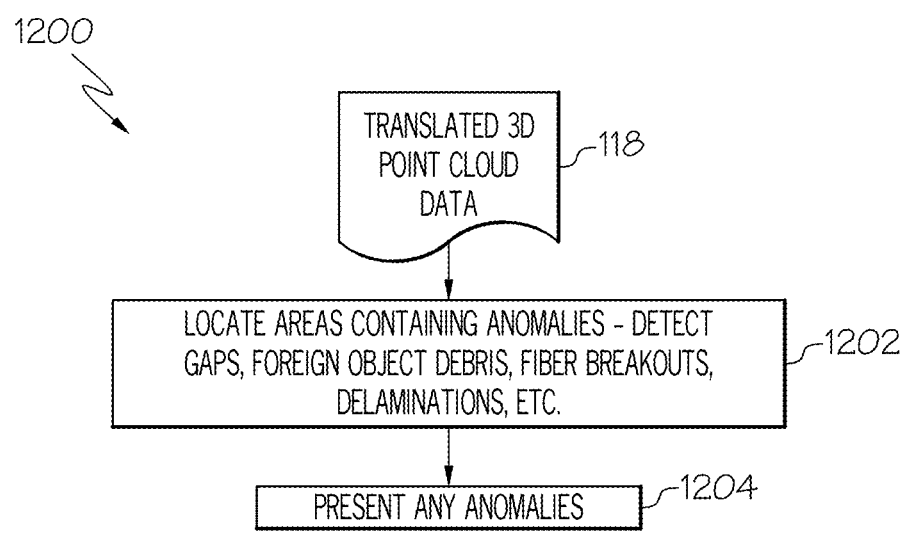
FIG. 12 is a flow chart of an example of a method for locating areas containing anomalies in a hole using the translated 3D point cloud data in accordance with an embodiment of the present disclosure.

In accordance with an example, performing analysis of the hole 202 in block 120 of FIG. 1 also includes locating one or more areas associated with the hole 202 that contain an anomaly or defect. Referring to FIG. 12, FIG. 12 is a flow chart of an example of method 1200 for locating areas containing anomalies or defects in a hole 202 using the translated 3D point cloud data 118 in accordance with an embodiment of the present disclosure. In block 1202, areas containing anomalies or defects associated with a hole 202 are located using the translated 3D point cloud data 118. FIGS. 13A-16B illustrate examples of locating anomalies or defects using the 3D point cloud data.

In block 1204, the anomaly or defect is presented. In accordance with an example, the anomaly or defect is presented on a display, such as display 220 in FIG. 2, to an operator. The anomalies or defects are presented as illustrated in the examples in FIGS. 13A-16B. The examples in FIGS. 13A-16B include a hole 202 drilled in workpiece, such as workpiece 204 in FIG. 2. In the example in FIG. 2, the workpiece 204 includes a panel including a plurality of layers 204a and 204b. As previously described, a first layer 204a includes a non-metallic layer 210, such as a carbon fiber layer, and a second layer 204b includes a metallic layer 212, such as aluminum, or some other metal or alloy. The anomaly or defect includes at least one of a gap, foreign object debris, a fiber breakout, a delamination, or other defect. The method 1200 is also useable to detect anomalies or defects in other types of workpieces.

Figure 13A:
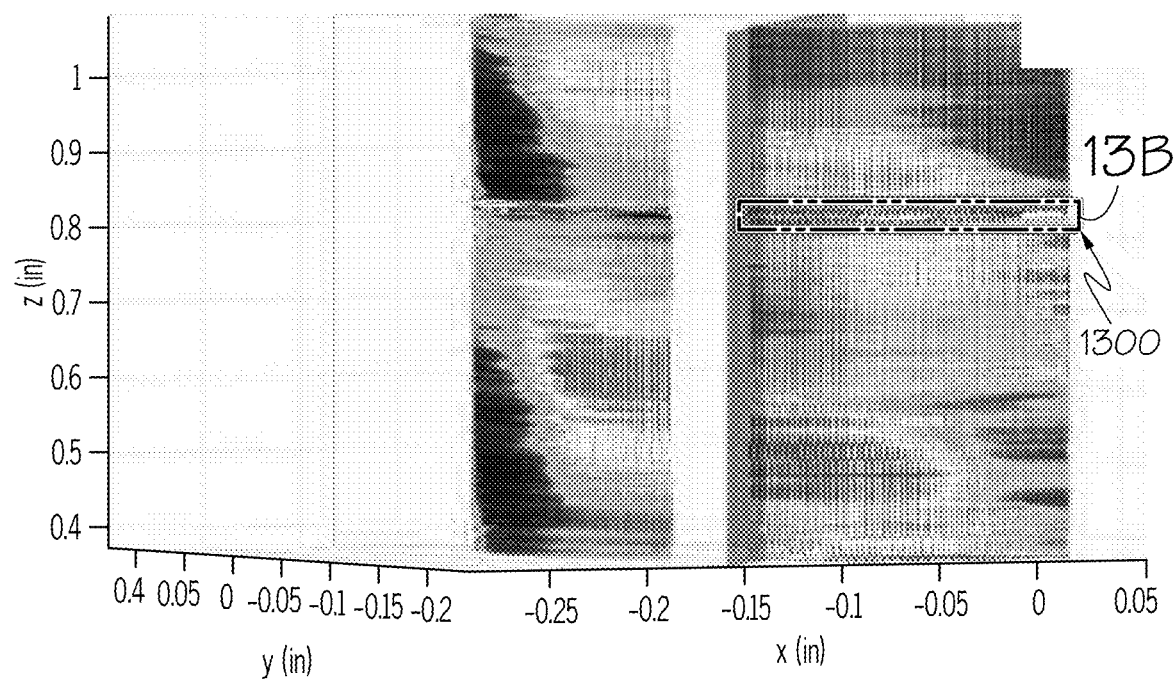
FIGS. 13A-13B are an illustration of an example of detecting gaps in a workpiece using the translated 3D point cloud data in accordance with an embodiment of the present disclosure.
Figure 13B:
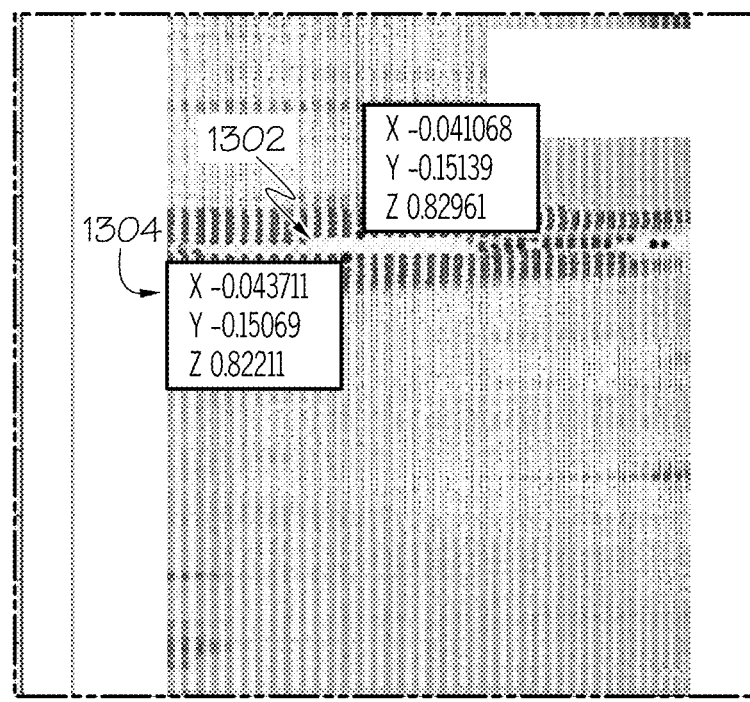

FIGS. 13A-13B are an illustration of an example of detecting an area 1300 of gaps 1302 in a workpiece, such as workpiece 204 in FIG. 2, using the translated 3D point cloud data 118 in accordance with an embodiment of the present disclosure. As illustrated in the example in FIGS. 13A-13B, location data 1304 associated with the gap 1302 is also presentable. A size of the gap 1302 or size of a portion of the gap 1302, such as width, is calculatable from the location data 1304.

Figure 14A:
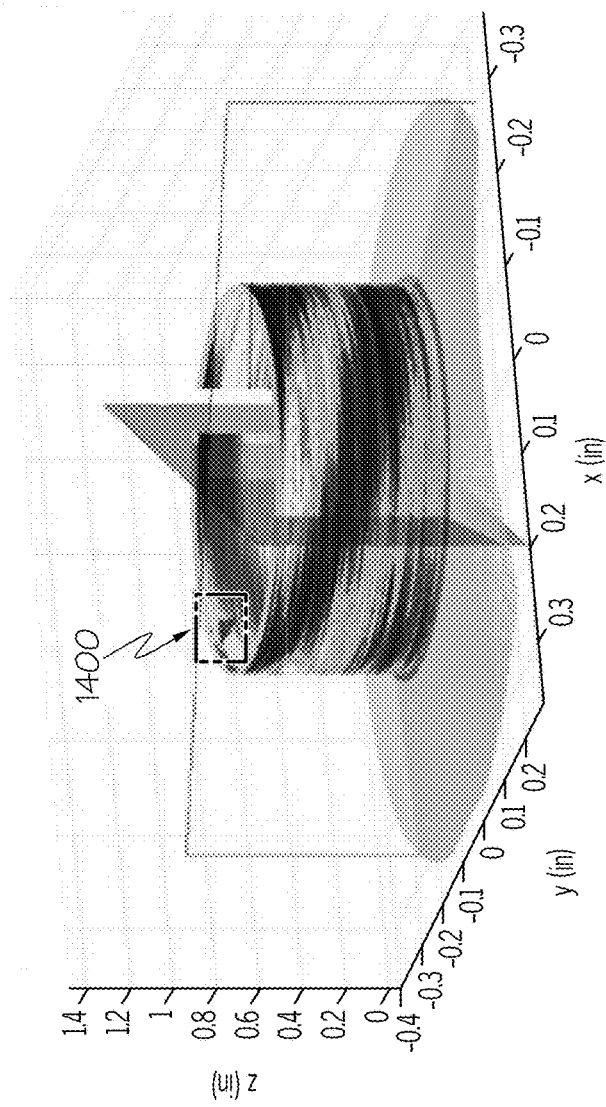
FIGS. 14A-14B are an illustration of an example of detecting foreign object debris in a workpiece using the translated 3D point cloud data in accordance with an embodiment of the present disclosure.
Figure 14B:
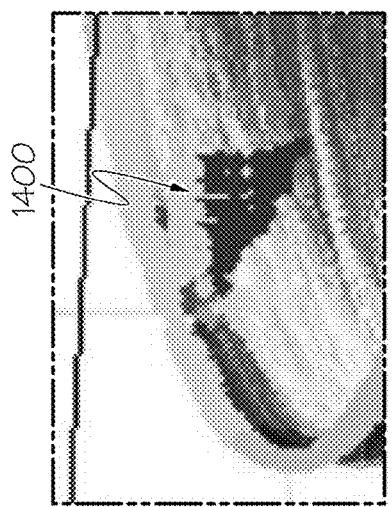

FIGS. 14A-14B are an illustration of an example of detecting foreign object debris 1400 in a workpiece 204 using the translated 3D point cloud data 118 in accordance with an embodiment of the present disclosure.

Figure 15A:
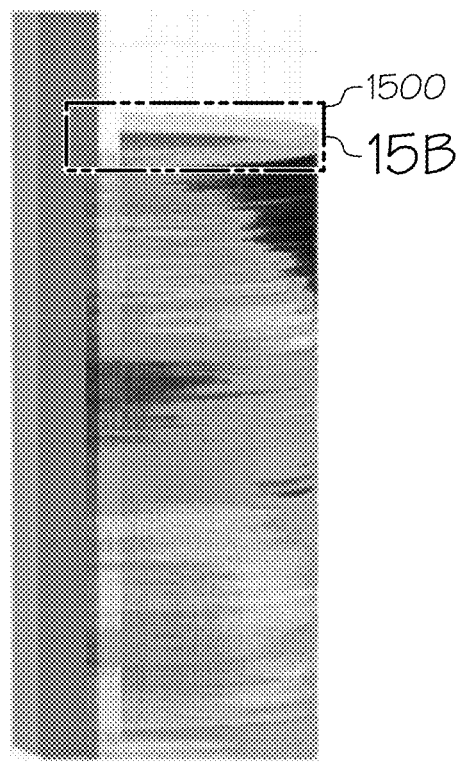
FIGS. 15A-15B are an illustration of an example of detecting an area of fiber breakouts in a workpiece using the translated 3D point cloud data in accordance with an embodiment of the present disclosure.
Figure 15B:

FIGS. 15A-15B are an illustration of an example of detecting an area 1500 of fiber breakouts 1502 in a workpiece 204 using the translated 3D point cloud data 118 in accordance with an embodiment of the present disclosure.

Figure 16A:
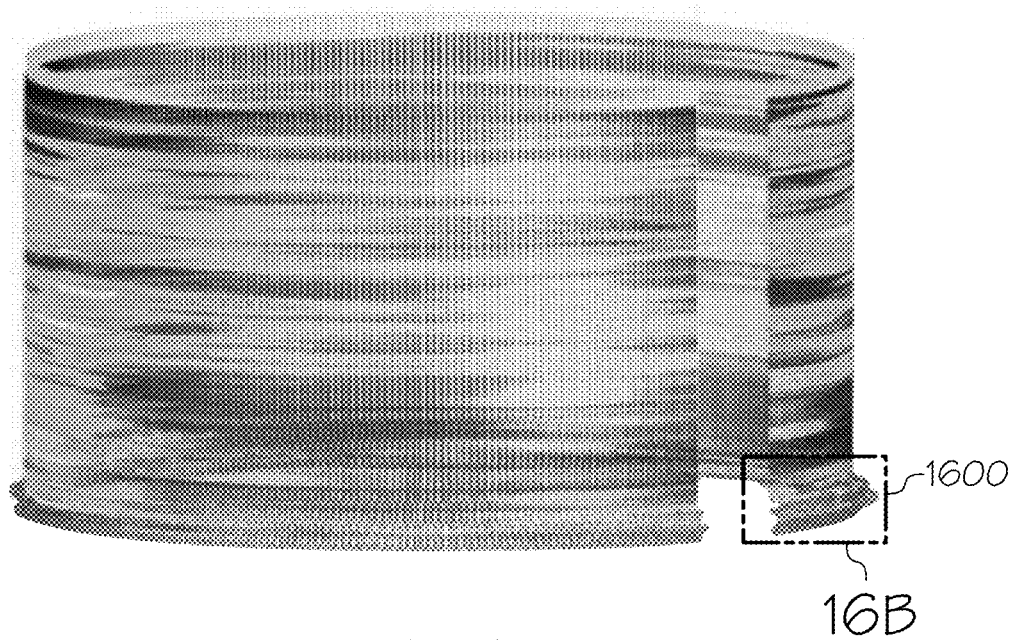
FIGS. 16A-16B are an illustration of an example of detecting fiber delamination in a workpiece using the translated 3D point cloud data in accordance with an embodiment of the present disclosure.
Figure 16B:
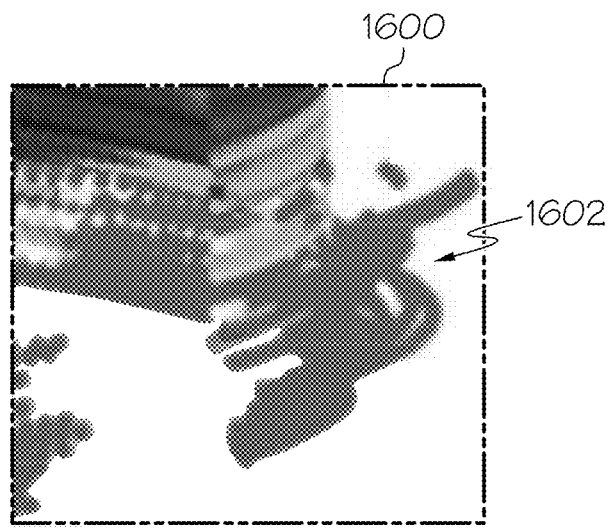

FIGS. 16A-16B are an illustration of an example of detecting an area 1600 of fiber delamination 1602 in a workpiece 204 using the translated 3D point cloud data 118 in accordance with an embodiment of the present disclosure.

Referring back to FIG. 2, FIG. 2 is a block schematic diagram of an example of a system 200 for generating a 3D point cloud data 102 (FIG. 1) for inspection of a hole, such as hole 202, in accordance with an embodiment of the present disclosure. The system 200 includes a processor 230 and a memory 232 associated with the processor 230. The memory 232 includes computer-readable program instructions 234 that, when executed by the processor 230 causes the processor 230 to perform a set of functions 236. The set of functions 236 include functions or operations for 3D hole inspection and conformance 238 as described herein. In accordance with an example, the method 100 of FIG. 1, method 600 of FIG. 6, method 1000 of FIG. 10, and method 1200 of FIG. 12 are embodied in the set of functions 236 and performed by the processor 230. In accordance with an example, the processor 230 and the memory 232 are embodied in a computer system 240 or similar system configured to perform the operations described herein.

The processor 230 is operatively coupled to a 3D optical scanning device 206 to generate the 3D point cloud data 102 as described in more detail herein. In accordance with the example in FIG. 2, the 3D optical scanning device 206 includes a robot that is configured to optical scan the hole 202 and generate the 3D point cloud 106 that includes 3D point cloud data 102.

Figure 17:
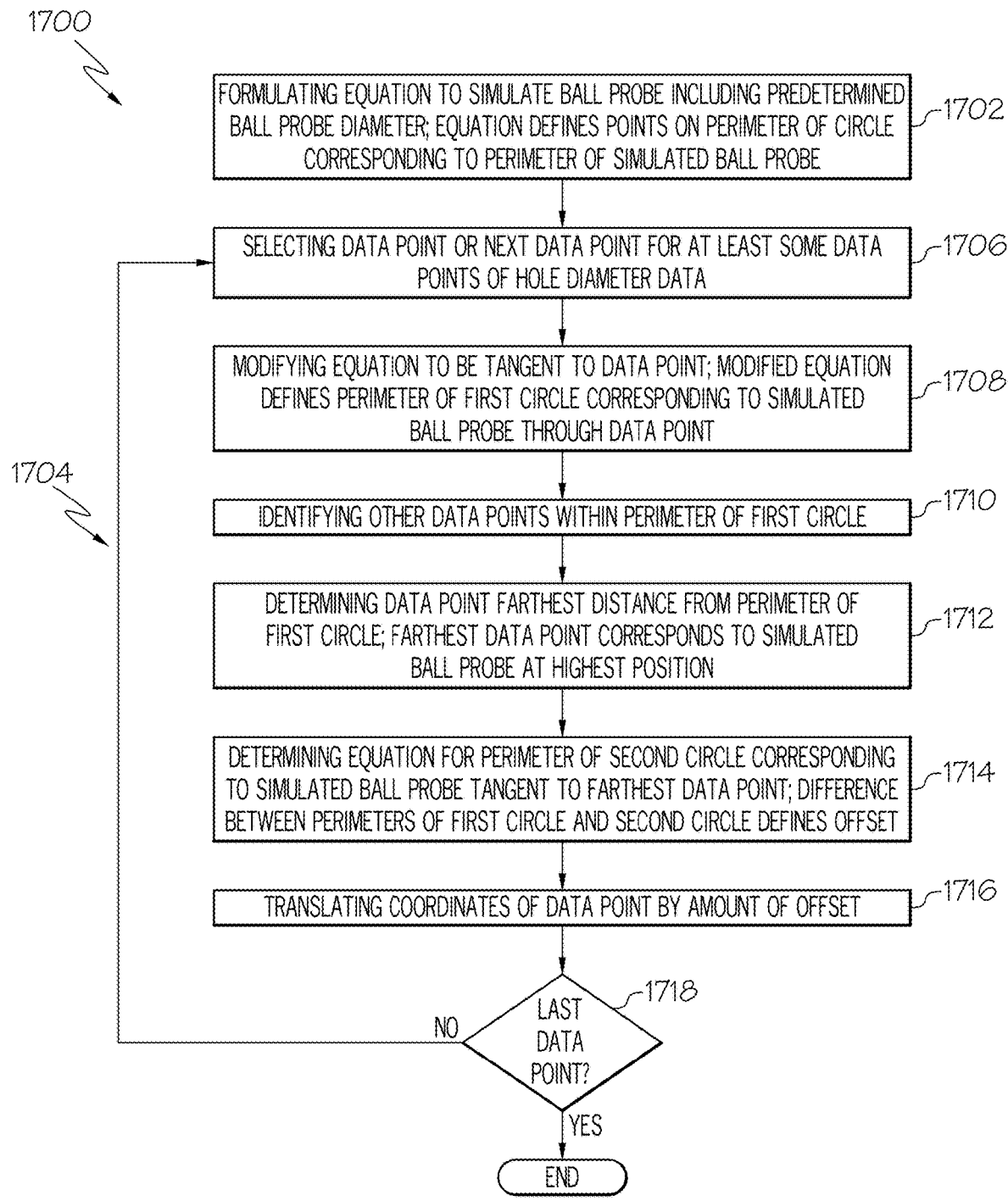
FIG. 17 is a flow chart of an example of a method for filtering or smoothing 3D point cloud data in accordance with an embodiment of the present disclosure.

FIG. 17 is a flow chart of an example of a method 1700 for filtering or smoothing hole diameter data of the hole in accordance with an embodiment of the present disclosure. In some examples, the method 1700 is used to perform the operation in block 615 in FIG. 6. Referring also to FIGS. 18A-18E, FIGS. 18A-18E illustrate the exemplary method 1700 for filtering or smoothing the hole diameter data in FIG. 17 using a simulated ball probe 1800.

In block 1702, the method 1700 for filtering or smoothing the hole diameter data includes formulating an equation to simulate the ball probe. The simulated ball probe 1800 includes a predetermined diameter. The equation defines points on a perimeter of a circle 1802 corresponding to a perimeter of the simulated ball probe 1800. In some examples the equation corresponds to equation 1:

$$y = v - \sqrt{r^2 - (x-u)^2}$$ Equation 1

Figure 18A:
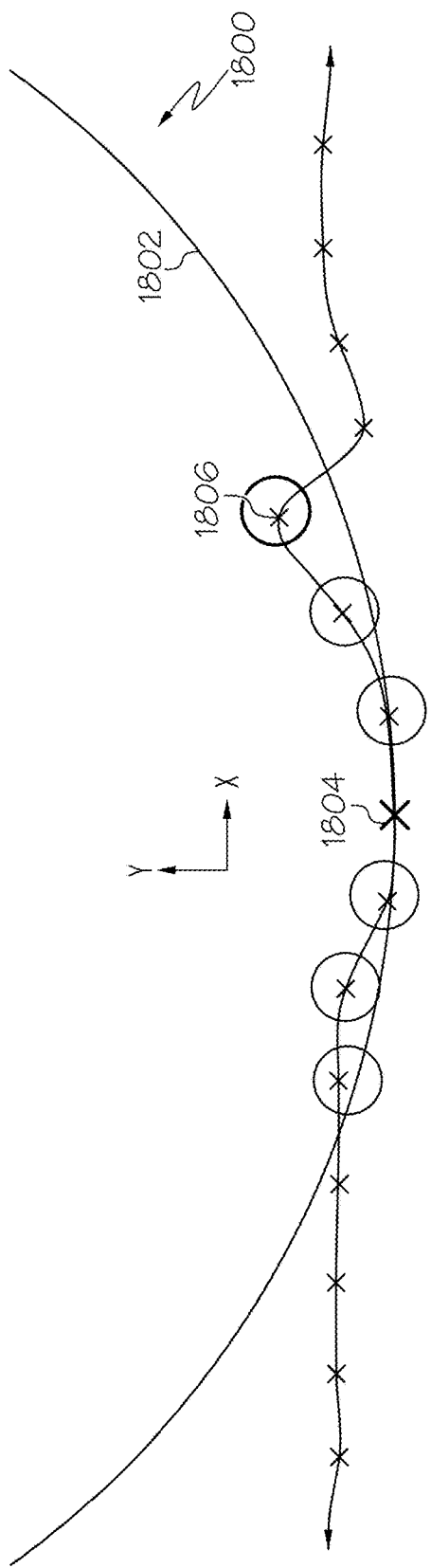

The equation corresponds to a bottom portion of the circle 1802 in FIG. 18A. V corresponds to a vertical position of a center of the circle or y coordinate position of the center of the circle based on the X-Y axis illustrated in FIG. 18A. U corresponds to a horizontal position of the center of the circle or x coordinate position of the center of the circle based on the X-Y axis. In some examples, filtering or smoothing the hole diameter data of the hole using a simulated ball probe 1800 includes a process 1704 as described with reference to FIG. 17 and as illustrated in FIGS. 18A-18E. In block 1706, the process 1704 includes selecting a data point 1804 (FIG. 18A) or a next selected data point for at least some data points of the multiplicity of data points of the hole diameter data of the hole.

In block 1708, the process 1704 includes modifying the equation, e.g., Equation 1, to be tangent to the selected data point. The equation defines a perimeter of a first circle 1802 corresponding to the simulated ball probe 1800 through the data point 1804. As described herein, for each data point that defines the hole wall, the equation for the circle is modified so that the equation for the circle is tangent to the data point as illustrated in FIG. 18A for data point 1804.

In block 1710, the process 1704 includes identifying other data points within the perimeter of the first circle 1802 or above the portion of the first circle 1802 corresponding to the simulated ball probe 1800. Other data points identified within the perimeter of the first circle 1802 are each enclosed in a circle in FIG. 18A.

In block 1712, the process 1704 includes determining a farthest data point 1806 of the other data points that is a farthest distance from the perimeter of the first circle 1802. The farthest data point 1806 corresponds to the simulated ball probe 1800 at a highest position.

Figure 18B:
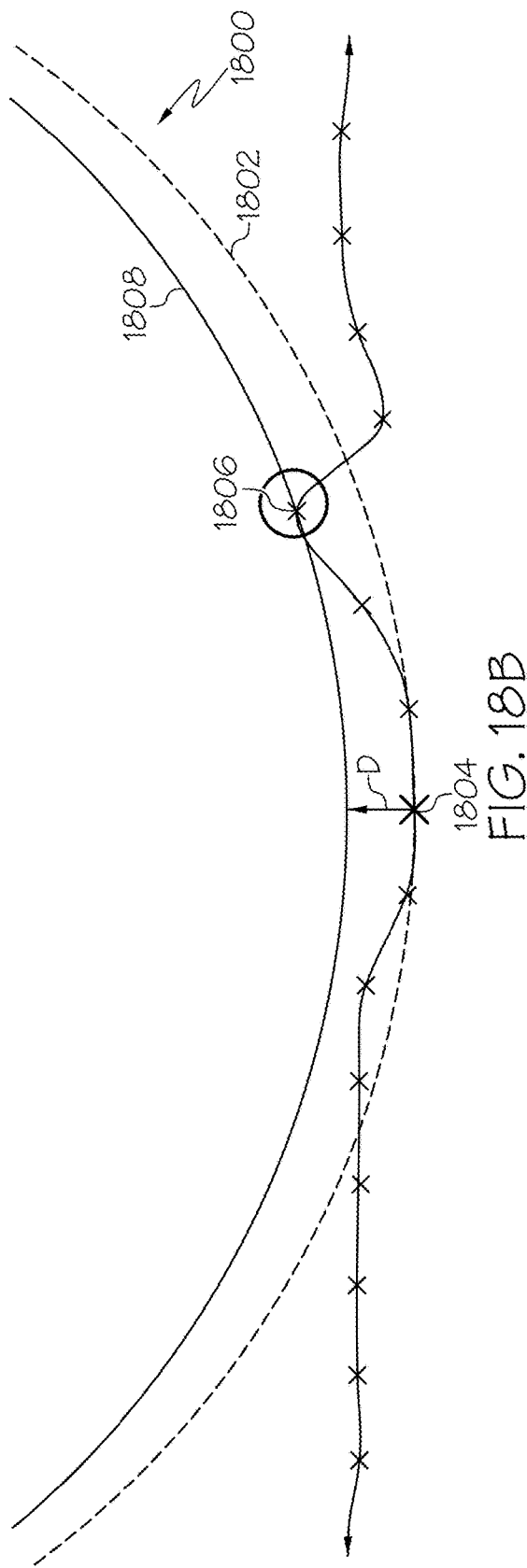

In block 1714, the process 1704 includes determining an equation for a perimeter of a second circle 1808 corresponding to the simulated ball probe 1800 tangent to the farthest data point 1806 as illustrated in FIG. 18B. The difference "D" between the perimeters of the first circle 1802 and the second circle 1808 defines an offset.

In block 1716, the process 1704 includes translating coordinates of the selected data point 1804 or a next selected data point by an amount of the offset.

Figure 18C:
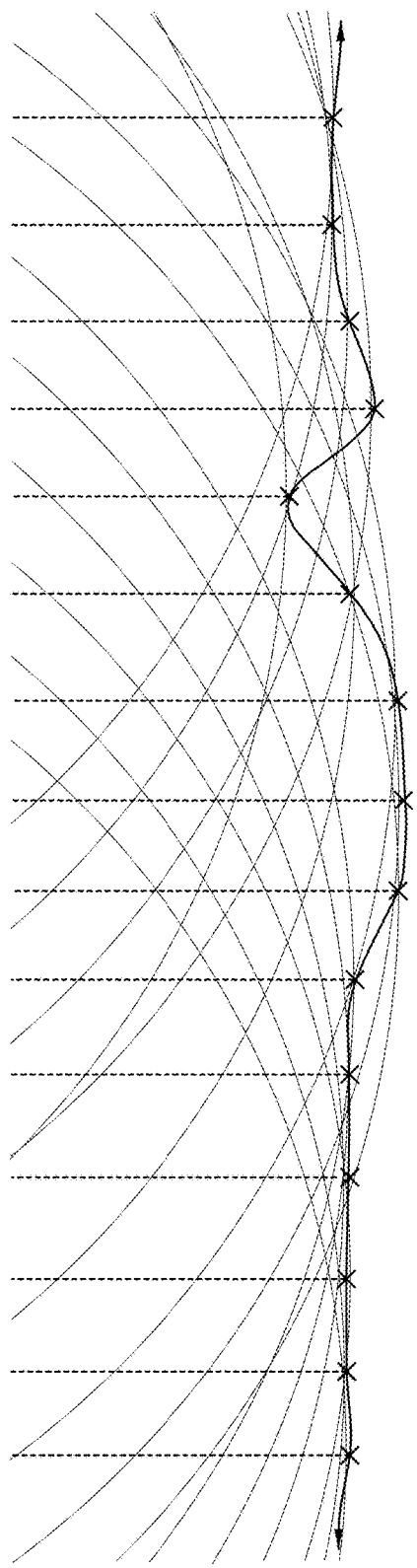

In block 1718 a determination is made whether the selected data point 1804 or next selected data points was a last data point of the at least some data points of the multiplicity of data points of the hole diameter data defining the hole or hole wall. If the selected data point 1804 or next selected data point was the last data point, the method 1700 or process 1704 ends at termination ("END"). If the selected data point 1804 was not the last data point, the method 1700 or process 1704 returns to block 1706 and the method 1700 or process includes selecting the next data point and repeating the process 1704 for each data point of the at least some data points of the hole diameter data of the hole. FIG. 18C illustrates selecting the next data point and repeating the process 1704 for each data point of the at least some data points. Selecting the next data point and repeating the process 1704 for each data point of the at least some data points in FIG. 18C also illustrates the simulated ball probe 1800 being placed at each data point of the at least some data points of the hole diameter data of the hole wall.

Figure 18D:
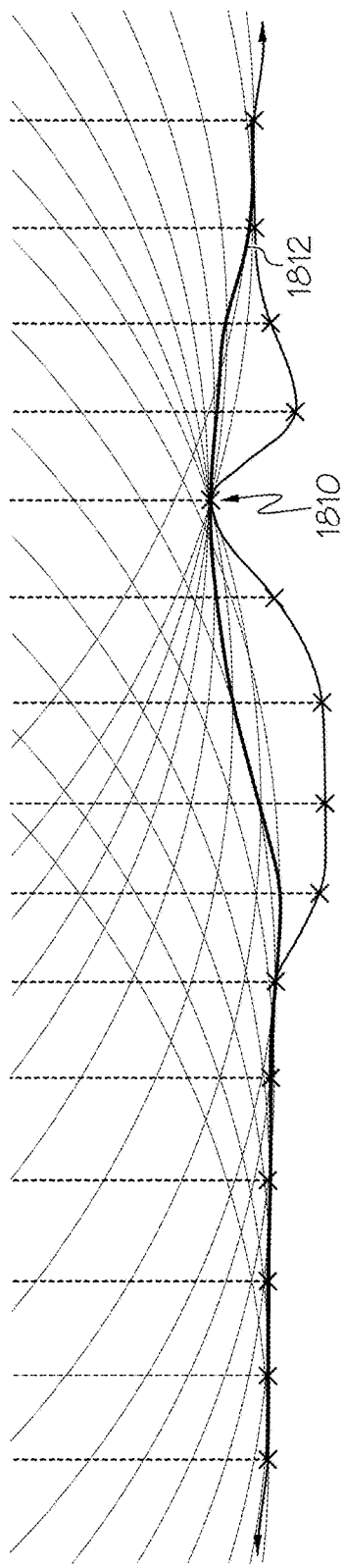

FIG. 18D illustrates translating coordinates of each data point by an amount of the offset in block 1716. As illustrated in FIG. 18D the perimeters of the circles corresponding to the simulated ball probe 1800 converge at a spike 1810 of the hole diameter data. The line 1812 illustrates the translated coordinates for the at least some data points of the hole diameter data as illustrated in FIGS. 18D and 18E. The translated coordinates for the at least some data points correspond to the filtered or smoothed hole diameter data of the hole or hole wall in FIG. 18E.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method, comprising:
    scanning, by a three-dimensional (3D) optical scanning device, a hole formed in a workpiece to generate a 3D point cloud of the hole defined in a 3-axis coordinate system of the 3D optical scanning device, wherein the 3D point cloud comprises a multiplicity of data points, and each data point comprises 3D point cloud data that provides a profile of the hole;
    separating the 3D point cloud data into individual 2D layers;
    fitting a circle to each layer of 3D point cloud data;
    fitting a linear line to an origin of each circle, wherein the linear line defines a center or axis of the hole;
    translating the 3D point cloud data to generate translated 3D point cloud data that facilitates analysis of the 3D point cloud, wherein translating the 3D point cloud data comprises realigning the center or axis of the hole to correspond to a Z-axis of a three-dimensional coordinate system; and
    performing analysis of the hole using the translated 3D point cloud data to determine conformance of the hole with a specification and to detect anomalies associated with the hole, wherein performing analysis of the hole comprises determining conformance of a diameter of the hole to the specification and wherein determining conformance of the diameter of the hole to the specification comprises:
        converting the translated 3D point cloud data to 2D data;
        choosing a first cutting plane parallel to an axis of the hole;
        choosing a second cutting plane rotated a predetermined number of degrees about the axis of the hole relative to the first cutting plane;
        determining the diameter of the hole along each cutting plane to provide hole diameter data;
        filtering or smoothing the hole diameter data to provide filtered or smoothed hole diameter data;
        generating a graph of the diameter of the hole along an extent of the hole for each cutting plane using the filtered or smoothed hole diameter data; and
        comparing the graphs of the diameter of the hole to the specification to determine conformance of the hole diameter to the specification.

2. The method of claim 1, wherein filtering or smoothing the hole diameter data comprises using a simulated ball probe.

3. The method of claim 1, wherein filtering or smoothing the hole diameter data comprises formulating an equation to simulate a ball probe comprising a predetermined diameter, wherein the equation defines points on a perimeter of a circle corresponding to a perimeter of the simulated ball probe.

4. The method of claim 3, wherein filtering or smoothing the hole diameter data comprises a process, the process comprising:

selecting a data point or a next selected data point for at least some data points of the multiplicity of data points of the hole diameter data of the hole;
modifying the equation to be tangent to the selected data point, wherein the equation defines a perimeter of a first circle corresponding to the simulated ball probe through the selected data point;
identifying other data points within the perimeter of the first circle;
determining a farthest data point of the other data points that is a farthest distance from the perimeter of the first circle, wherein the farthest data point corresponds to the simulated ball probe at a highest position;
determining an equation for a perimeter of a second circle corresponding to the simulated ball probe tangent to the farthest data point, wherein a difference between the perimeters of the first circle and the second circle defines an offset; and
translating coordinates of the selected data point or the next selected data point by an amount of the offset.

5. The method of claim 4, further comprising selecting the next data point and repeating the process for each data point of the at least some data points, wherein the translated coordinates for the at least some data points correspond to the filtered or smoothed hole diameter data.

6. The method of claim 1, wherein
realigning the center of the hole comprises translating an X, Y coordinates of the 3D point cloud data in each 2D layer so that the center of the hole corresponds to the Z-axis.

7. The method of claim 1, wherein comparing the graphs of the diameter of the hole comprises comparing the graphs of the diameter of the hole along the extent of the hole to the specification by superimposing a range of tolerance of the diameter of the hole on the graphs to determine conformance of the diameter of the hole to the specification.

8. The method of claim 1, further comprising:
    presenting a notification in response to the diameter of the hole being in conformance with the specification; and
    presenting an alert in response to the diameter of the hole not being in conformance with the specification.

9. The method of claim 1, wherein performing analysis of the hole using the translated 3D point cloud data comprises calculating erosion of the hole caused during drilling the hole.

10. The method of claim 9, wherein calculating erosion of the hole comprises:
    generating a plurality of graphs of a diameter of the hole along an extent of the hole, each graph corresponding to a different location about a circumference of the hole;
    superimposing a range of tolerance of a diameter of the hole on the graphs;
    identifying one or more spikes in the graphs above the range of tolerance of the diameter of the hole;
    determining a width of each spike of the one or more spikes;
    summing the width of the one or more spikes to calculate the erosion of the hole; and
    presenting erosion data to an operator.

11. The method of claim 10, wherein determining a width of each spike comprises:
    calculating a slope of each spike;
    interpolating a position on each spike relative to a maximum diameter tolerance of the diameter of the hole; and determining a distance between two points on the spike where the spike corresponds to the maximum diameter tolerance of the diameter of the hole.

12. The method of claim 1, wherein performing analysis of the hole comprises locating one or more areas associated with the hole that contain an anomaly, wherein the anomaly comprises at least one of a gap, foreign object debris, a fiber breakout, and a delamination.

13. The method of claim 1, wherein the hole is drilled in a panel comprising a plurality of layers.

14. The method of claim 13, wherein the plurality of layers comprise a non-metallic layer and a metallic layer.

15. A system comprising:
a processor; and
a memory associated with the processor, the memory comprising computer-readable program instructions that, when executed by the processor causes the processor to perform a set of functions comprising:
scanning, by a three-dimensional (3D) optical scanning device, a hole formed in a workpiece to generate a 3D point cloud of the hole defined in a 3-axis coordinate system of the 3D optical scanning device, wherein the 3D point cloud comprises a multiplicity of data points, and each data point comprises 3D point cloud data that provides a profile of the hole;
separating the 3D point cloud data into individual 2D layers;
fitting a circle to each layer of 3D point cloud data;
fitting a linear line to an origin of each circle, wherein the linear line defines a center or axis of the hole;
translating the 3D point cloud data to generate translated 3D point cloud data that facilitates analysis of the 3D point cloud, wherein translating the 3D point cloud data comprises realigning the center or axis of the hole to correspond to a Z-axis of a three-dimensional coordinate system; and
performing analysis of the hole using the translated 3D point cloud data to determine conformance of the hole with a specification and to detect anomalies associated with the hole, wherein performing analysis of the hole comprises determining conformance of a diameter of the hole to the specification and wherein determining conformance of the diameter of the hole to the specification comprises:
converting the translated 3D point cloud data to 2D data;
choosing a first cutting plane parallel to an axis of the hole;
choosing a second cutting plane rotated a predetermined number of degrees about the axis of the hole relative to the first cutting plane;
determining the diameter of the hole along each cutting plane to provide hole diameter data;
filtering or smoothing the hole diameter data to provide filtered or smoothed hole diameter data;
generating a graph of the diameter of the hole along an extent of the hole for each cutting plane using the filtered or smoothed hole diameter data; and
comparing the graphs of the diameter of the hole to the specification to determine conformance of the hole diameter to the specification.

16. The system of claim 15, wherein filtering or smoothing the hole diameter data comprises using a simulated ball probe.

17. The system of claim 15, wherein filtering or smoothing the hole diameter data comprises formulating an equation to simulate a ball probe comprising a predetermined diameter, wherein the equation defines points on a perimeter of a circle corresponding to a perimeter of the simulated ball probe.

18. The system of claim 17, wherein filtering or smoothing the hole diameter data comprises a process, the process comprising:
selecting a data point or a next selected data point for at least some data points of the multiplicity of data points of the hole diameter data of the hole;
modifying the equation to be tangent to the selected data point, wherein the equation defines a perimeter of a first circle corresponding to the simulated ball probe through the selected data point;
identifying other data points within the perimeter of the first circle;
determining a farthest data point of the other data points that is a farthest distance from the perimeter of the first circle, wherein the farthest data point corresponds to the simulated ball probe at a highest position;
determining an equation for a perimeter of a second circle corresponding to the simulated ball probe tangent to the farthest data point, wherein a difference between the perimeters of the first circle and the second circle defines an offset; and
translating coordinates of the selected data point or the next selected data point by an amount of the offset.

19. The system of claim 18, wherein determining conformance of the diameter of the hole to the specification further comprising selecting the next data point and repeating the process for each data point of the at least some data points, wherein the translated coordinates for the at least some data points correspond to the filtered or smoothed hole diameter data.

20. The system of claim 15, wherein performing analysis of the hole further comprises locating one or more areas associated with the hole that contain an anomaly, the anomaly comprising at least one of a gap, foreign object debris, a fiber breakout, and a delamination.

* * * * *